United States Patent
Park et al.

(10) Patent No.: US 10,075,530 B2
(45) Date of Patent: Sep. 11, 2018

(54) METHOD AND ELECTRONIC DEVICE FOR ESTABLISHING CONNECTION WITH EXTERNAL ELECTRONIC DEVICE

(71) Applicant: Samsung Electronics Co., Ltd, Gyeonggi-do (KR)

(72) Inventors: Chun-Ho Park, Seoul (KR); Jun-Sik Kwon, Gyeonggi-do (KR); Gi-Beom Kim, Gyeonggi-do (KR); Jun-Hak Lim, Gyeonggi-do (KR); Hyuk Kang, Gyeonggi-do (KR); In-Ji Jin, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 6 days.

(21) Appl. No.: 15/424,679

(22) Filed: Feb. 3, 2017

(65) Prior Publication Data
US 2017/0231016 A1    Aug. 10, 2017

(30) Foreign Application Priority Data
Feb. 4, 2016  (KR) ........................ 10-2016-0014298

(51) Int. Cl.
*H04W 4/00* (2018.01)
*H04L 29/08* (2006.01)
(Continued)

(52) U.S. Cl.
CPC .............. *H04L 67/12* (2013.01); *H04W 4/80* (2018.02); *H04W 12/00* (2013.01); *H04W 76/10* (2018.02); *H04W 76/14* (2018.02); *H04W 84/18* (2013.01)

(58) Field of Classification Search
CPC . H04W 76/02; H04W 76/021; H04W 76/023; H04W 76/025; H04W 4/02;
(Continued)

(56) References Cited

U.S. PATENT DOCUMENTS

| 2013/0091288 A1 | 4/2013 | Shalunov et al. |
| 2013/0237270 A1* | 9/2013 | Suumaki ............... H04W 4/008 455/517 |

(Continued)

FOREIGN PATENT DOCUMENTS

| KR | 1020050091221 | 9/2005 |
| KR | 1020070091904 | 9/2007 |

(Continued)

*Primary Examiner* — Thanh Le

(57) ABSTRACT

A method and electronic device for establishing a connection with an external electronic device are disclosed. The electronic device may include: at least one communication interface configured to acquire information on at least one external device and a processor. The processor is configured to acquire, from a first external electronic device, a signal associated with identification information on the first external electronic device through the at least one communication interface. The processor is further configured to generate connection information for establishing a connection with a second external electronic device at least partially based on the identification information. The processor is further configured to establish the connection with the second external electronic device through the at least one communication interface at least partially based on the generated connection information.

20 Claims, 17 Drawing Sheets

(51) Int. Cl.
*H04W 12/00* (2009.01)
*H04W 4/80* (2018.01)
*H04W 76/10* (2018.01)
*H04W 84/18* (2009.01)
*H04W 76/14* (2018.01)

(58) Field of Classification Search
CPC ......... H04W 4/04; H04W 4/06; H04W 4/008; H04L 67/12
See application file for complete search history.

(56) References Cited

U.S. PATENT DOCUMENTS

| | | | |
|---|---|---|---|
| 2016/0286593 A1* | 9/2016 | Lee | H04W 76/021 |
| 2017/0202045 A1* | 7/2017 | Ko | H04W 76/023 |
| 2017/0273131 A1* | 9/2017 | Nagahiro | H04W 76/025 |

FOREIGN PATENT DOCUMENTS

| | | |
|---|---|---|
| KR | 1020090114018 | 11/2009 |
| KR | 1020150068413 | 6/2015 |

* cited by examiner

METHOD AND ELECTRONIC DEVICE FOR ESTABLISHING CONNECTION WITH EXTERNAL ELECTRONIC DEVICE

CROSS-REFERENCE TO RELATED APPLICATION(S) AND CLAIM OF PRIORITY

The present application is related to and claims the priority under 35 U.S.C. § 119(a) to Korean Application Serial No. 10-2016-0014298, which was filed in the Korean Intellectual Property Office on Feb. 4, 2016, the entire content of which is hereby incorporated by reference.

TECHNICAL FIELD

The present disclosure relates to a method and electronic device for establishing a connection with an external electronic device. More particularly, the present disclosure relates to a method and electronic device for establishing a connection with an external electronic device through short range communication.

BACKGROUND

Recently, with the rise of Internet of things (IoT) technologies, many things are connected through short range communication so as to transmit and receive signals, information or the like. Thus, as IoT technology has been developed, whether a plurality of devices are connected to each other for the first time or reconnected will have a great impact on user utilization.

In addition, as the plurality of devices are connected through short range communication, it is desirable to provide a service for a guest who visits a place in which the plurality of devices are equipped as well as for owners of the plurality of devices, through the connection with the plurality of devices and the guest's device.

SUMMARY

As described above, when non-restrictive connections are established between all of the electronic devices, it may cause a crosstalk with a signal to be transmitted and received to and from the electronic devices. In addition, when the non-restrictive connections are established between all of the electronic devices, a security problem may occur.

To address the above-discussed deficiencies, it is a primary object to provide a method and an electronic device for establishing a connection between electronic devices, in order to solve the above mentioned problems or other problems.

According to various embodiments of the present disclosure, an electronic device may include: at least one communication interface configured to acquire information on at least one external device; and a processor, wherein the processor is configured to: acquire, from a first external electronic device, a signal associated with identification information on the first external electronic device through the at least one communication interface; generate connection information for establishing a connection with a second external electronic device at least partially based on the identification information; and establish the connection with the second external electronic device through the at least one communication interface at least partially based on the generated connection information.

According to various embodiments of the present disclosure, a method for establishing, by an electronic device, a connection with an external electronic device may include: acquiring, from a first external electronic device, a signal associated with identification information on the first external electronic device; generating connection information for establishing a connection with a second external electronic device at least partially based on the identification information; and establishing the connection with the second external electronic device through the at least one communication interface at least partially based on the generated connection information.

According to various embodiments of the present disclosure, an electronic device may establish a connection with a second external electronic device on the basis of a signal received from a first external electronic device. Therefore, the electronic device may prevent a crosstalk of a signal transmitted and received to and from the first external electronic device by establishing the connection on the basis of the signal received from the first external electronic device.

In addition, the electronic device may establish the connection with the second external electronic device by using user's biometric information. Through which, the electronic device may ensure the security of a connection which is established between electronic devices.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
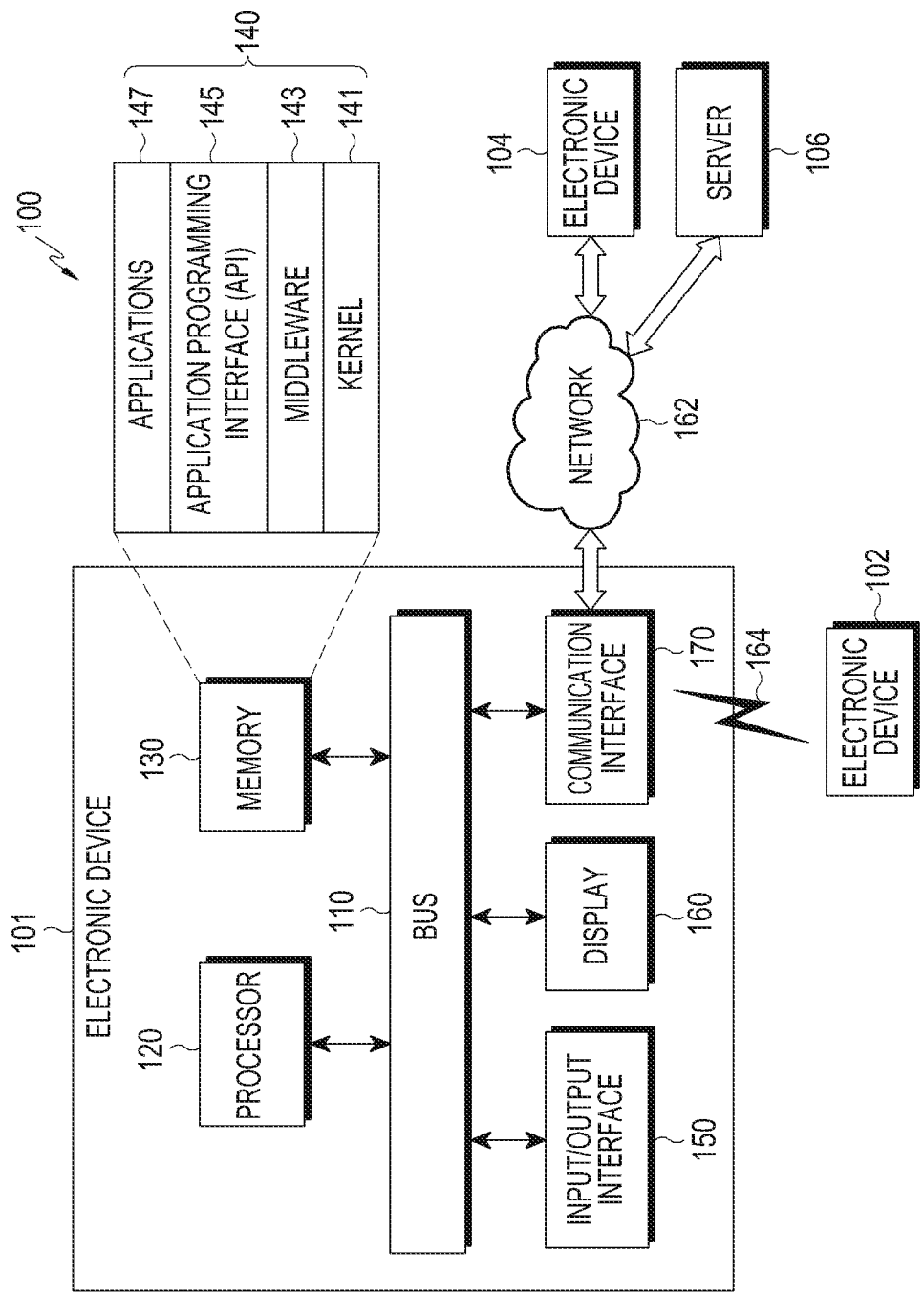
FIG. 1 illustrates a network environment including an electronic device according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there is no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship, and a gyro-compass), avionics, security devices, an automotive head unit, a robot for home or industry, an automatic teller's machine (ATM) in banks, point of sales (POS) in a shop, or internet of things device (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g. an artificial intelligence electronic device) using an electronic device.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit which interconnects the components 110 to 170 and delivers communication (for example, a control message and/or data) between the components 110 to 170.

The processor 120 may include one or more of a Central Processing Unit (CPU), an Application Processor (AP), and a Communication Processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (for example, the bus 110, the processor 120, the memory 130, etc.) of the electronic device 101 to one or more of the application programs 147. For example, the middleware 143 may perform scheduling or loading balancing on the one or more task requests by processing the one or more task requests according to the priorities assigned to the one or more application programs.

The API 145, which is an interface through which the applications 147 control functions provided from the kernel 141 or the middleware 143, may include, for example, at least one interface or function (for example, instruction) for file control, window control, image processing, text control, etc.

The input/output interface 150 may function as, for example, an interface that can forward instructions or data, which are input from a user or an external device, to the other element(s) of the electronic device 101. Furthermore, the input/output interface 150 may output instructions or data, which are received from the other element(s) of the electronic device 101, to the user or the external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (for example, text, images, videos, icons, symbols, etc.) for a user. The display 160 may include a touch screen and may receive, for example, a touch, gesture, proximity, or hovering input using an electronic pen or the user's body part.

The communication interface 170 may configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like, as a cellular communication protocol. In addition, the wireless communication may include, for example, short range communication 164. The short range communication 164A may include at least one of, for example, Wi-Fi, Bluetooth, Near Field Communication (NFC), Global Navigation Satellite System (GNSS), etc. The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), etc. The network 162 may include at least one of a communication network such as a computer network (e.g., a LAN or a WAN), the Internet, and a telephone network.

Figure 14:
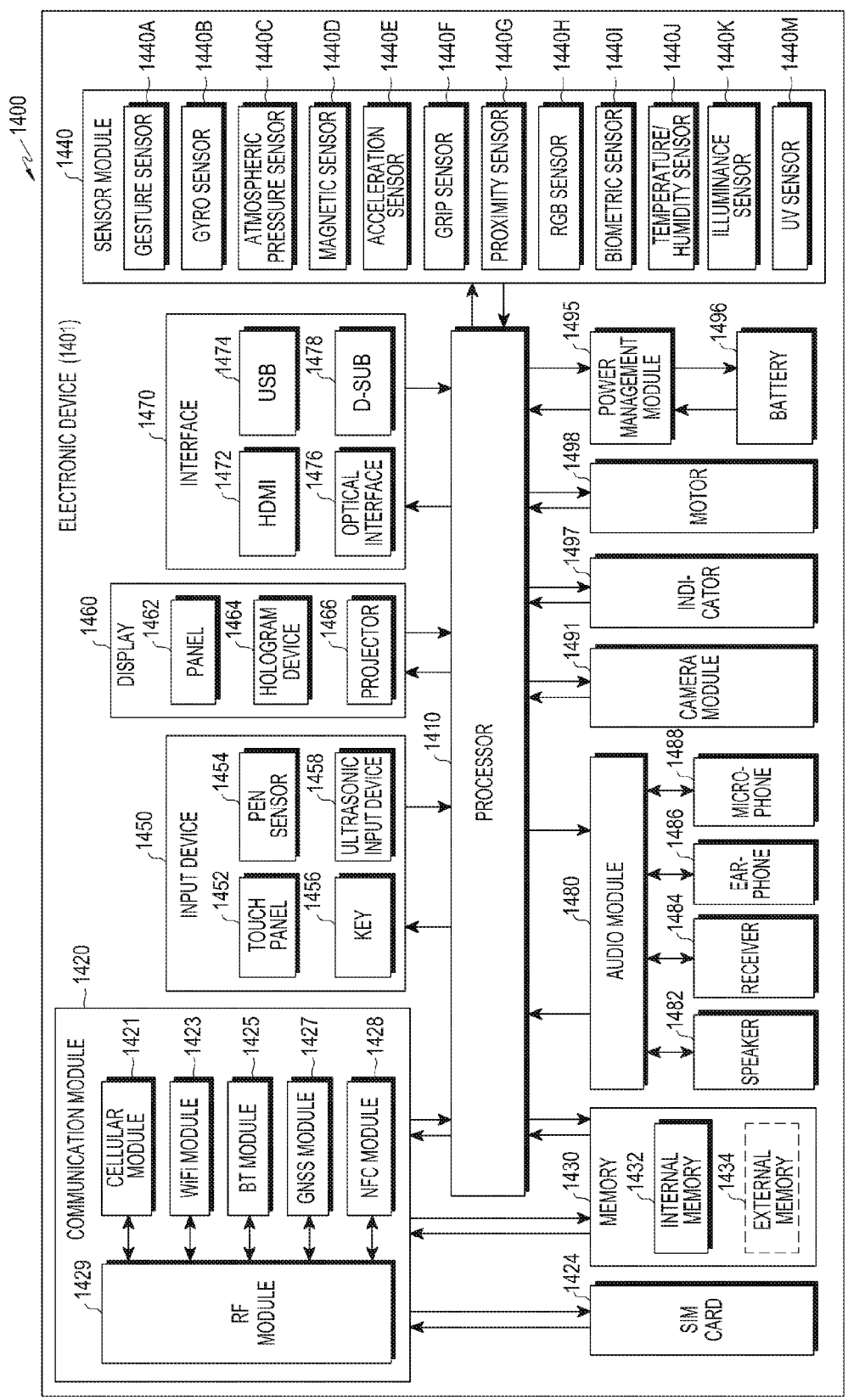
FIG. 14 illustrates a block diagram of an electronic device according to various embodiments of the present disclosure.

In addition, the communication interface 170 may include a plurality of communication interfaces supporting respective communication methods, as illustrated in FIG. 14. Furthermore, the communication interface 170 may include a sensing unit for sensing light and a microphone for sensing sound. As an embodiment, the sensing unit may include at least one of a photo sensor, a light reception unit, a photo detector, a photo diode, and a camera. The communication interface 170 may receive, through the sensing unit or the microphone, a signal transmitted through light or sound.

Each of the first and second external electronic devices 102 and 104 may be of the same or a different type from the electronic device 101. According to an embodiment, the server 106 may include a group of one or more servers. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may request another device (for example, the electronic device 102 or 104 or the server 106) to perform at least some functions relating thereto instead of, or in addition to, performing the functions or services by itself. The other electronic device (for example, the electronic device 102 or 104 or the server 106) may perform the requested functions or the additional functions and may transfer the execution result to the electronic device 101. The electronic device 101 may provide the received result as it is, or may additionally process the received result to provide the requested functions or services. To this end, for example, cloud computing, distributed computing, or client-server computing technology may be used.

The processor 120 may process at least a part of information acquired from other elements (for example, at least one of the memory 130, the input/output interface 150, the communication interface 170, etc.), and use the same in various methods. For example, the processor 120 may control at least some functions of the electronic device 101 so that the electronic device 101 may interwork with other electronic devices (for example, the electronic device 102 or 104 or the server 106). The processor 120 may be integrated into the communication interface 170. According to an embodiment, at least one configuration of the processor 120 may be included in the server 106, and at least one operation implemented in the processor 120 can be supported by the server 106.

According to an embodiment, the memory 130 may include instructions causing the processor 120 to perform operations. For example, the memory 130 may include instructions causing the processor 120 to control other elements and interact with other electronic devices 102 and 104 or the server 106. The processor 120 may control other elements of the electronic device 101 and interact with other electronic devices 102 and 104 or the server 106 based on the instructions stored in the memory 130. Hereinafter, an operation of the electronic device 101 will be described on the basis of each element of the electronic device 101. In addition, instructions causing each element to perform an operation can be stored in the memory 130.

According to various embodiments of the present disclosure, the processor 120 may acquire, from the first external electronic device 102, a signal associated with the identification information on the first external electronic device 102 through the communication interface 170. The first external electronic device 102 may transmit a signal based on various communication protocols such as Bluetooth, Wi-Fi, ANT, ANT+, ZigBee, NFC, and the like. In addition, the first external electronic device 102 may transmit a signal by using light, and may transmit a signal by using sound.

In an embodiment, the first external electronic device 102 may be included in various electronic devices. For example, the first external electronic device 102 may be included in a lighting device to transmit a signal through the light, and may be included in an audio device to transmit a signal through a sound. In addition, the first external electronic device 102 may be included in another electronic device to transmit a signal on the basis of the various communication protocols described above. In addition, the first external electronic device 102 may transmit a signal to the electronic device 101, through a network where the first external electronic device 102 and the electronic device 101 are connected to each other using a wireless communication circuit included in each communication interface.

In an embodiment, the first external electronic device 102 may be a beacon transmitter which transmits a beacon signal. The first external electronic device 102 may transmit the beacon signal to a neighboring electronic device based on Bluetooth Low Energy (BLE). The first external electronic device 102 may periodically transmit the beacon signal, and may transmit the beacon signal when a specific event occurs.

In an embodiment, the first external electronic device 102 may determine whether a person has access through at least one sensor included in the first external electronic device 102. The first external electronic device 102 may determine whether the person has access based on information acquired through the sensor. When it is determined that the person has achieved access, the first external electronic device 102 may transmit the signal. In addition, the first external electronic device 102 may transmit the signal to a specific electronic device, and may broadcast the signal without specifying a destination.

The signal transmitted from the first external electronic device 102 may be a signal associated with identification information on the first external electronic device 102. For example, the signal may include the identification information on the first external electronic device 102. The identification information may be information for identifying the first external electronic device 102, and the identification information may include security information which is used for the connection establishment between electronic devices which have received signals from the first external electronic device 102.

In addition, the signal may further include time information which is used for the connection between the electronic devices which have received signals from the first external electronic device 102.

In an embodiment, the first external electronic device 102 may adjust an arrival distance of a signal depending on the type of information included in the signal. For example, the first external electronic device 102 may control a communication interface of the first external electronic device 102 such that a signal including the identification information is transmitted up to a first arrival distance, and may control the communication interface such that a signal including time information is transmitted up to a second arrival distance which is greater than the first arrival distance.

According to various embodiments of the present disclosure, the processor 120 may generate connection information based at least partially based on the identification information. The connection information may be generated in various formats at least partially based on the identification information. Further, the connection information may include information to be used for the connection establishment with another external electronic device, for example, a second external electronic device 104. For example, the connection information may include at least one of information on the electronic device 101 or may include information on the second external electronic device 104, and the information on the electronic device 101 or the information on the second external electronic device 104 may include MAC address, device identification information, network information, etc. of the electronic device 101 or the second external electronic device which are used for the connection establishment. Further, the connection information may change as the identification information is changed.

According to various embodiments of the present disclosure, the processor 120 may establish a connection with the second external electronic device 104 through the communication interface 170 at least partially based on the generated connection information. The processor 120 may be connected to the second external electronic device 104 through the network 162 as shown in FIG. 1, and although not illustrated, the processor 120 may be connected through short-range communication without passing through the network 162. Further, the processor 120 may establish a connection with the second external electronic device 104 through a communication method, which is different from a communication method for receiving the signal from the first external electronic device 102.

For example, the processor 120 may acquire a signal from the first external electronic device 102 through a first communication interface and establish a connection with the second external electronic device 104 through a second communication interface, among the first communication interface and second communication interface included in the communication interface 170. Thus, in order to establish a connection with the second external electronic device 104, the processor 120 may use at least one of the identification information and time information included in the signal which is acquired from the first external electronic device 102, regardless of the communication method for establishing the connection with the second external electronic device 104.

According to various embodiments of the present disclosure, the second external electronic device 104 may receive, from the first external electronic device 102, a signal associated with the identification information, and may generate connection information at least partially based on the identification information. In order to establish the connection with the second external electronic device 104, the processor 120 may acquire connection information generated by the second external electronic device 104, and compare the connection information generated by the second external electronic device 104 with the connection information generated at least partially based on the identification information.

When the connection information generated by the second external electronic device 104 corresponds to the connection information generated at least partially based on the identification information, the processor 120 may establish the connection with the second external electronic device 104. Meanwhile, when the connection information generated by the second external electronic device 104 is different from the connection information generated at least partially based on the identification information, the processor 120 may not establish the connection with the second external electronic device 104. Accordingly, the processor 120 may additionally use connection information generated based on identification information included in a signal received from the first external electronic device 102 as well as information used in a general short range connection process. Thus, the processor 120 may establish a connection with other external electronic devices based on the first external electronic device 102. A detailed method for determining, by the processor 120, a corresponding relationship of the above-mentioned connection information will be described later.

According to various embodiments of the present disclosure, the second external electronic device 104 may include a plurality of external electronic devices. For example, the second external electronic device 104 may include a third external electronic device and a fourth external electronic device, and in this case, the processor 120 may establish a connection with each of the third external electronic device and fourth external electronic device based on the connection information generated through the communication interface 170. The processor 120 may establish the connection with each of the third external electronic device and the fourth external electronic device through the same communication method, and it may establish the connection with each of the third external electronic device and fourth external electronic device through different communication methods.

In addition, in establishing a connection with the second external electronic device 104, the processor 120 may additionally use network information corresponding to the second external electronic device 104. For example, the processor 120 may receive, from the second external electronic device 104, network information in response to a connection request which is received from the second external electronic device 104 through the communication interface 170 or a connection request which is transmitted to the second external electronic device 104 through the communication interface 170. The processor 120 may establish the connection with the second external electronic device 104 based on network information acquired from the second external electronic device 104 and the generated connection information.

According to various embodiments of the present disclosure, when control signals for controlling an operation of the electronic device 101 are received from a plurality of external electronic devices, the processor 120 may compare signal strengths of each of the received control signals. The processor 120 may execute a command corresponding to a control signal which has the largest signal strength based on a result of the comparison.

For example, the processor 120 may receive a first control signal and second control signal from the second external electronic device and the third electronic device, respectively, which have established the connection. Accordingly, the processor 120 may compare signal strengths of the first control signal and second control signal. When signal strength of the first control signal is greater than signal strength of the second control signal, the processor 120 may execute a command corresponding to the first control signal and reject a command corresponding to the second control signal.

According to various embodiments of the present disclosure, the processor 120 may receive a connection request from a third external electronic device which has acquired a signal from the first external electronic device 102 through the communication interface 170. As the connection request is received from the third external electronic device, the processor 120 may share, with the third external electronic device, information on the second external electronic device 104 with which the connection has been established. For example, as the connection request is received from the third external electronic device, the processor 120 may transmit, to the third external electronic device, information on the second external electronic device 104 with which the connection has been established, so as to share the information on the second external electronic device 104 with the third external electronic device. Accordingly, the third external electronic device may acquire information on external electronic devices capable of establishing a connection based on the first external electronic device 102 so as to use the information for the connection establishment.

According to various embodiments of the present disclosure, the processor 120 may determine whether user biometric information is requested for establishing a connection with an external electronic device which has received a signal from the first external electronic device 102, on the basis of the signal received from the first external electronic device 102. In order to enhance the security of the connection established between electronic devices, the user biometric information can be used for the connection establishment between electronic devices.

The first external electronic device 102 may generate a signal including information, an indicator, and the like, which are associated with a bio-signal, and transmit the same. The processor 120 may identify the information, indicator, and the like included in the signal received from the first external electronic device 102, through which the processor 120 may determine whether user biometric information is requested to establish the connection, with external electronic devices, which transmits signals from the first external electronic device 102.

When it is determined that the user biometric information is requested based on the signal obtained from the first external electronic device 102, the processor 120 may display, on the display 160, a pop-up message requesting the user biometric information or output a voice requesting the user biometric information through the speaker. The processor 120 may acquire the user biometric information through a sensor for measuring the user biometric information included in the electronic device 101. Here, the user biometric information may include all pieces of biometric information which can be available for identifying users, such as body temperature, heart rate, fingerprint, iris, voice, etc.

The processor 120 may generate the connection information based on the user biometric information and identification information acquired through the sensor. Thus, the security can be enhanced in establishing connection between electronic devices.

Figure 2:
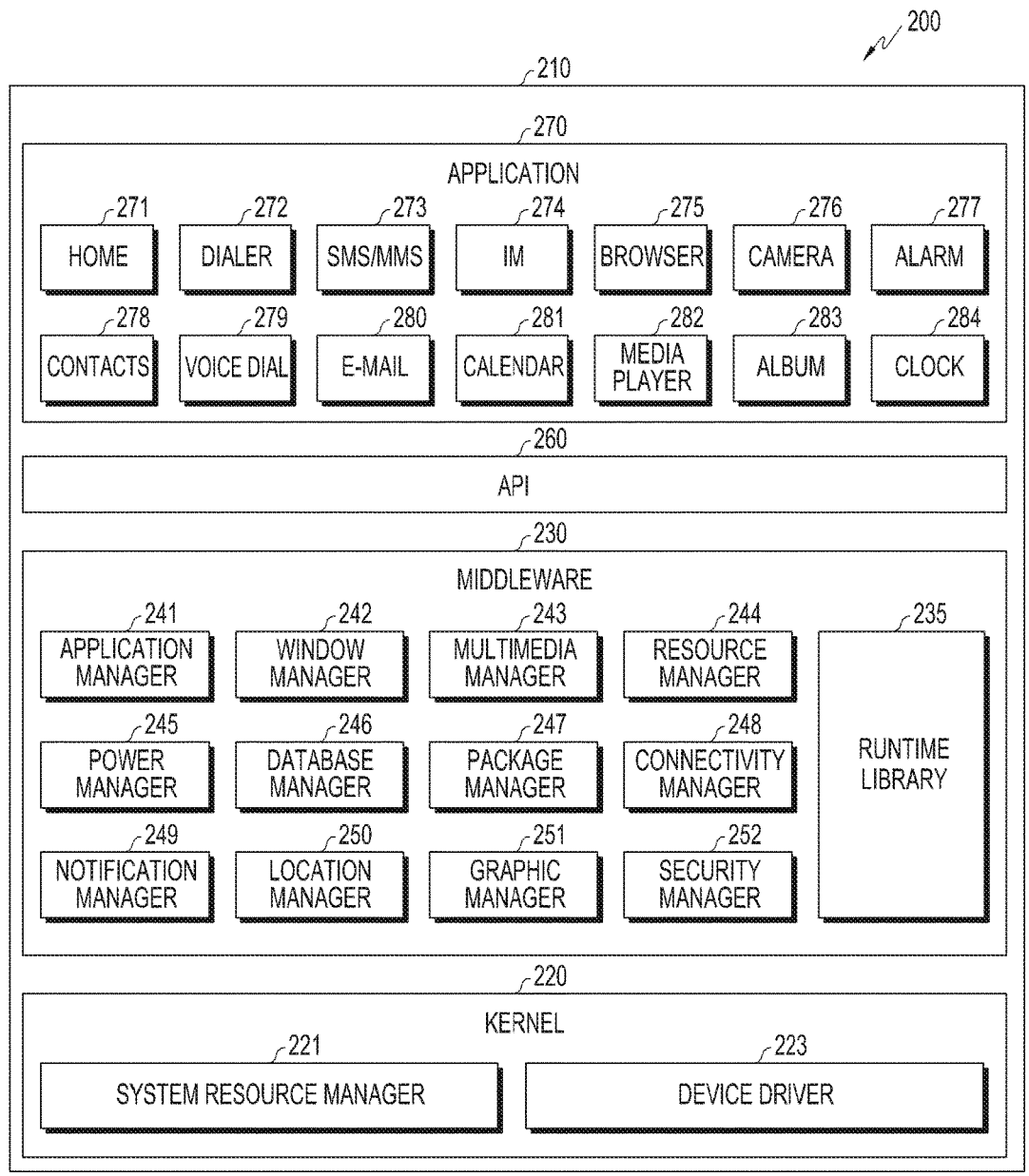
FIG. 2 illustrates a block diagram of a programming module according to various embodiments of the present disclosure.

FIG. 2 is a block diagram of a program module according to various embodiments. According to an embodiment, the program module 210 (for example, the program 140) may include an Operating System (OS) that controls resources relating to an electronic device (for example, the electronic device 101) and/or various applications (for example, the application programs 147) that are executed in the operating system. The operating system may be, for example, Android, iOS, Windows, Symbian, Tizen, Bada, and the like.

The program module 210 may include a kernel 220, middleware 230, an Application Programming Interface (API) 260, and/or applications 270. At least a part of the program module 210 may be preloaded on the electronic device, or may be downloaded from an external electronic device (for example, the electronic device 102 or 104 or the server 106).

The kernel 220 (for example, the kernel 141) may include, for example, a system resource manager 221 and/or a device driver 223. The system resource manager 221 may control, allocate, or retrieve system resources. According to an embodiment, the system resource manager 221 may include a process manager, a memory manager, a file system manager, etc. The device driver 223 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 230 may provide a function required by the applications 270 in common or provide various functions to the applications 270 through the API 260 so that the applications 270 can efficiently use limited system resources within the electronic device. According to an embodiment, the middleware 230 (e.g., the middleware 143) may include, for example, at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include, for example, a library module that a compiler uses in order to add a new function through a programming language while the applications 270 are being executed. The runtime library 235 may perform input/output management, memory management, the functionality for an arithmetic function, and the like.

The application manager 241 may manage, for example, the life cycle of at least one of the applications 270. The window manager 242 may manage Graphical User Interface (GUI) resources used on a screen. The multimedia manager 243 may determine formats required to reproduce various media files and may encode or decode a media file using a coder/decoder (codec) appropriate for the corresponding format. The resource manager 244 may manage resources, such as the source code, the memory, the storage space, and the like of at least one of the applications 270.

The power manager 245 may operate together with, for example, a Basic Input/Output System (BIOS) to manage a battery or power and provide power information required for the operation of the electronic device. The database manager 246 may generate, search for, and/or change a database to be used by at least one of the applications 270. The package manager 247 may manage the installation or update of an application that is distributed in the form of a package file.

The connectivity manager 248 may manage a wireless connection, such as Wi-Fi, Bluetooth, and the like. The notification manager 249 may display or notify of an event, such as an arrival message, an appointment, a proximity notification, etc., in such a manner as not to disturb a user. The location manager 250 may manage the location information of the electronic device. The graphic manager 251 may manage a graphic effect to be provided to a user and a user interface relating to the graphic effect. The security manager 252 may provide various security functions required for system security, user authentication, etc. According to an embodiment, in a case where the electronic device (for example, the electronic device 101) has a telephone call function, the middleware 230 may further include a telephony manager for managing a voice or video call function of the electronic device.

The middleware 230 may include a middleware module that forms a combination of various functions of the above-described elements. The middleware 230 may provide specialized modules according to the types of operating systems in order to provide differentiated functions. Furthermore, the middleware 230 may dynamically remove some of the existing elements, or may add new elements.

The API 260 (for example, the API 145) is, for example, a set of API programming functions, and may be provided with different configurations according to operating systems. For example, in the case of Android or iOS, one API set may be provided for each platform, and in the case of Tizen, two or more API sets may be provided for each platform.

The applications 270 (for example, the application programs 147) may include one or more applications that can perform functions, for example, home 271, dialer 272, SMS/MMS 273, Instant Message (IM) 274, browser 275, camera 276, alarm 277, contacts 278, voice dial 279, e-mail 280, calendar 281, media player 282, album 283, clock 284, health care (for example, measuring exercise quantity or blood sugar), and environment information (for example, atmospheric pressure, humidity, temperature information, and the like).

According to an embodiment, the applications 270 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an embodiment, the applications 270 may include applications (for example, a health care application of a mobile medical appliance, and the like) that are specified according to attributes of an external electronic device (for example, the electronic device 102 or 104). According to an embodiment, the applications 270 may include applications that are received from an external electronic device (for example, the server 106, or the electronic device 102 or 104). According to an embodiment, the applications 270 may include preloaded applications or third-party applications that can be downloaded from a server. Names of the elements of the program module 210, according to the above-described embodiments of the present disclosure, may change depending on the type of OS.

According to various embodiments, at least a part of the program module 210 may be implemented in software, firmware, hardware, or a combination of two or more thereof. At least some of the program module 210 may be implemented (e.g., executed) by, for example, the processor (e.g., the processor 120). At least some of the program module 210 may include, for example, a module, a program, a routine, a set of instructions, and/or a process for performing one or more functions.

Figure 3:
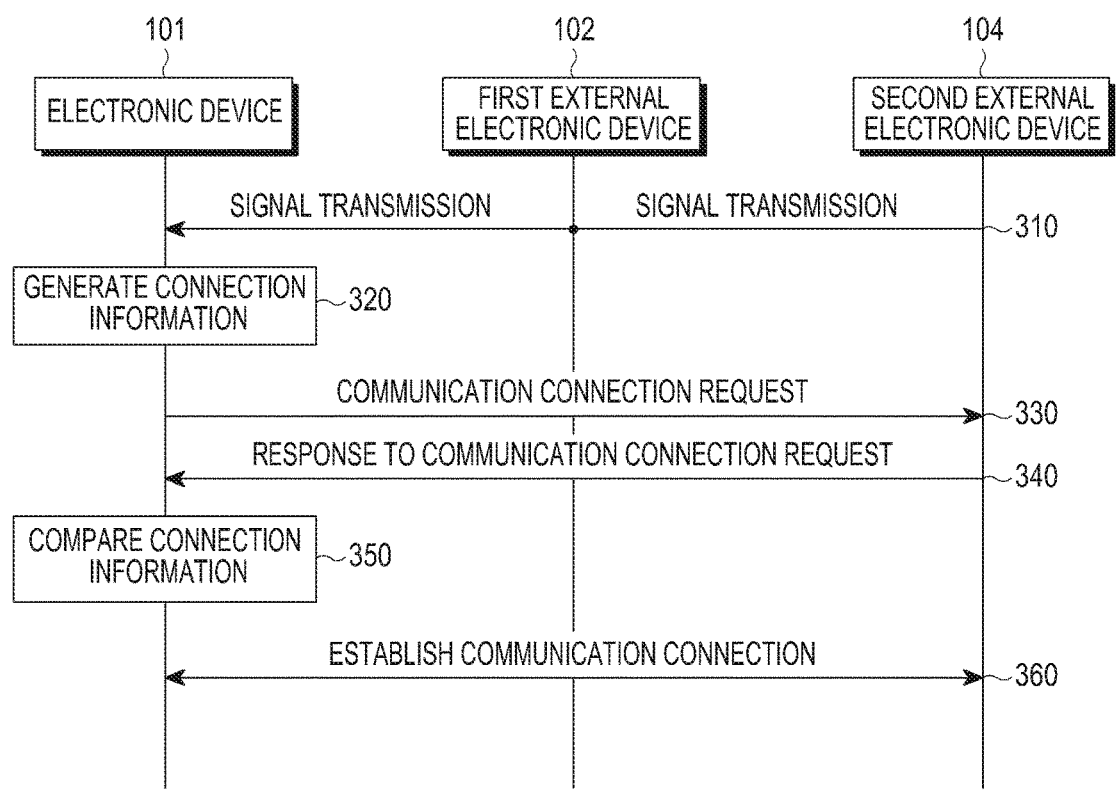
FIG. 3 illustrates a flowchart of a method for establishing a connection with a second external electronic device by an electronic device according to various embodiments of the present disclosure.

FIG. 3 is a flowchart illustrating a method for establishing a connection, by an electronic device, with a second external electronic device according to various embodiments of the present disclosure.

In operation 310, the first external electronic device 102 may transmit a signal associated with identification information on the first external electronic device 102, on the basis of various communication protocols. For example, the signal may include the identification information on the first external electronic device 102. In addition, the signal may further include time information which is used for a connection between electronic devices which have received the signal from the first external electronic device 102. The identification information may be information for identifying the first external electronic device 102, and the identification information may include security information which is used to establish a connection between electronic devices which have received a signal from the first external electronic device 102.

In addition, the first external electronic device 102 may transmit the signal by using light or sound. The first external electronic device 102 may periodically transmit a signal in various formats or transmit the signal when a specific event occurs. The first external electronic device 102 may transmit the signal to all of the electronic devices within a range where the signal can be transmitted. In order to illustrate the connection establishment between the electronic device 101 and the second external electronic device 104, FIG. 3 does not illustrate an operation of receiving, by the second external electronic device 104, a signal from the first external electronic device 102. The second external electronic device 104 is an electronic device located in an area allowing the reception of the signal from the first external electronic device 102, and the second external electronic device 104 may also, in common with the electronic device 101, receive a signal associated with the identification information from the first external electronic device 102, and may generate connection information based on the identification information included in the signal.

In operation 320, the electronic device 101 may generate connection information at least partially based on the identification information. The connection information may be generated in various formats at least partially based on the identification information such that the connection information includes the identification information or the identification information can be identified through the connection information. When the identification information includes security information, the electronic device 101 may generate the connection information in various formats such that the connection information further includes the security information or the identification information is encrypted into the security information.

In addition, the connection information may include information to be used to establish a connection with another external electronic device, for example, the second external electronic device 104. For example, the connection information may include at least one of the information on the electronic device 101 or information on the second external electronic device 104. For example, the information on the electronic device 101 or information on the second external electronic device 104 may include a MAC address, device identification information, network information, and the like of the electronic device 101 or the second external electronic device 104, which are used for the connection establishment.

In operation 330, the electronic device 101 may perform an operation of searching for at least one electronic device for connection establishment, and may make a request for a connection to one external electronic device of the retrieved at least one external electronic device, for example, the second external electronic device 104. In addition, the electronic device 101 may broadcast the connection request to an area around the first external electronic device 102 in which reception of a signal from the first external electronic device 102 is to be allowed. In this case, the operation for searching for an external electronic device for connection establishment may be omitted.

In operation 340, the second external electronic device 104 may transmit a response for a connection request to the electronic device 101 according to the connection request received from the electronic device 101. According to an embodiment, although not illustrated, the response for the connection request may include connection information generated based on the identification information included in the signal received, from the first external electronic device 102, by the second external electronic device 104. In addition, the connection information may include various pieces of information for the connection establishment, such as MAC addresses, device identification information, network information, etc. of the second external electronic device 104.

In operation 350, the electronic device 101 may compare the connection information generated by the electronic device 101, in operation 320, with the connection information generated by the second external electronic device 104, which is included in the response received from the second external electronic device 104.

In operation 360, when the connection information generated by the second external electronic device 104 and the connection information generated by the electronic device 101 correspond to each other, the electronic device 101 may establish a connection with the second external electronic device 104. Specifically, the electronic device 101 may check identification information used for generating each piece of connection information, and check an external electronic device identified through the identification information. When external electronic devices identified through each piece of identification information are the same, the electronic device 101 may determine that all pieces of connection information correspond to each other, and when the external electronic devices identified through each piece of identification information are not the same, the electronic device 101 may determine that all pieces of the connection information do not correspond to each other.

For example, the electronic device 101 may check that identification information used for the generation of connection information of the electronic device 101 is identification information for identifying the first external electronic device 102, and identification information used for the generation of connection information of the second external electronic device 104 is also identification information for identifying the first external electronic device 102. Accordingly, the electronic device 101 may determine that the connection information of the electronic device 101 and the identification information of the second external electronic device 104 correspond to each other.

In addition, when the identification information further includes security information that is used for the connection establishment between electronic devices which have received signals from the first external electronic device 102, the electronic device 101 may determine whether the connection information of the electronic device 101 and the identification information of the second external electronic device 104 correspond to each other by further including operations of comparing whether security information included in the identification information used for the generation of connection information of the electronic device 101 and security information included in the identification information used for the generation of connection information of the second external electronic device 104 match each other, and decrypting the identification information through the security information.

In addition, although it is illustrated in FIG. 3 that operation 340 and operation 350 are performed by the electronic device 101, but it is not limited thereto, and the second external electronic device 104 may perform the operations 340 and 350. In this case, the electronic device 101 may perform a communication connection request in operation 330 by including the connection information generated in operation 320 in the communication connection request.

When the connection information generated by the second external electronic device 104 and the connection information generated by the electronic device 101 correspond to each other, the electronic device 101 may use various pieces of information of the second external electronic device 104 for the connection establishment, which are included in the connection information in order to establish a connection with the second external electronic device 104.

In addition, although it is described in FIG. 3 that the electronic device 101 is connected with a single second external electronic device 104, but it is not limited thereto, and the electronic device 101 may establish a connection with a plurality of second external electronic devices. In this case, the electronic device 101 may compare connection information generated by the electronic device 101 with connection information generated by each of the plurality of second external electronic devices in the same method as described in FIG. 3 so as to establish connections with each of the plurality of second external electronic devices.

Figure 4A:
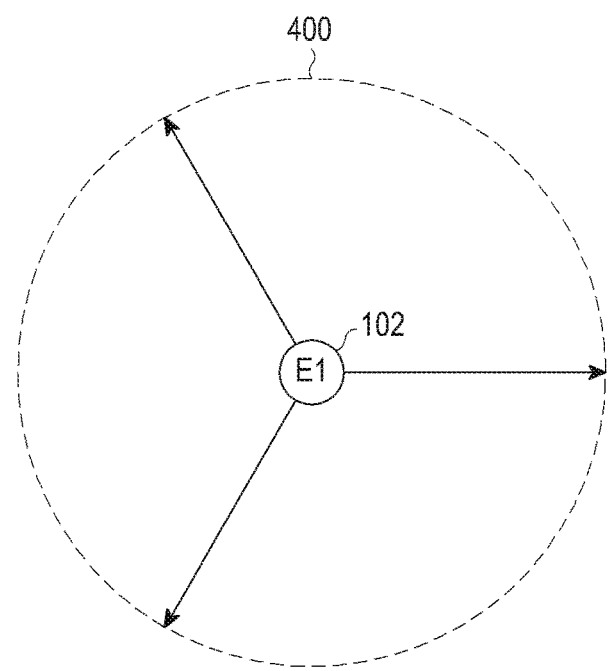
FIGS. 4A to 4C illustrate operations of generating connection information by a second external electronic device according to various embodiments of the present disclosure.
Figure 4B:
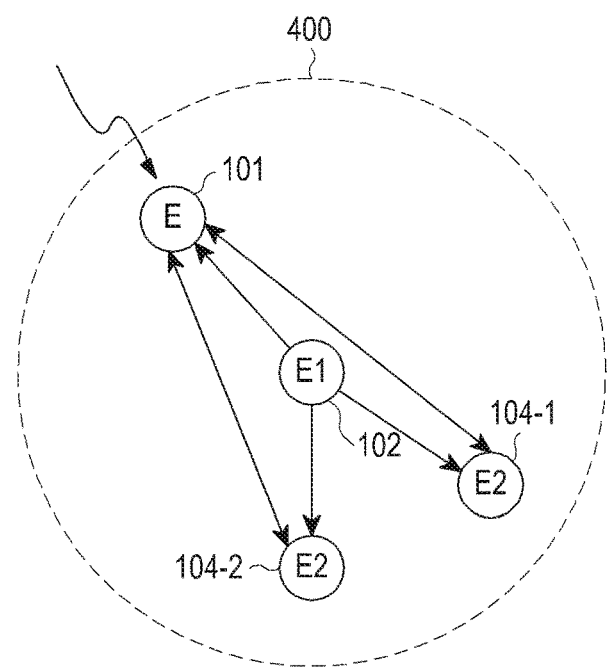
Figure 4C:
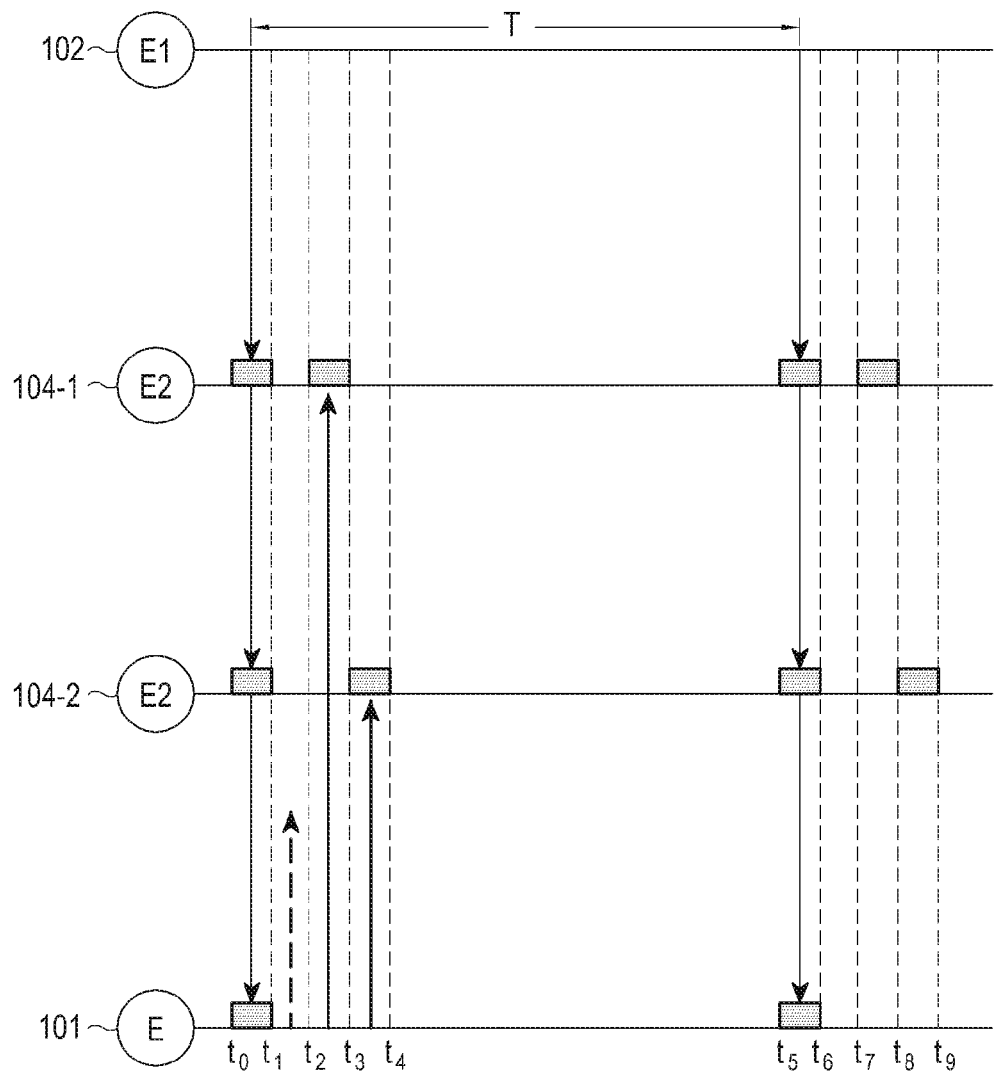

FIGS. 4A to 4C illustrate operations of generating connection information by a second external electronic device according to various embodiments of the present disclosure.

Referring to FIG. 4A, the first external electronic device 102 may periodically transmit a signal associated with the identification information on the first external electronic device 102 in various formats or may transmit the signal when a specific event occurs. The first external electronic device 102 may transmit the signal such that electronic devices located in a first area 400 allowing the transmission of the signal is able to receive the signal. For example, the first external electronic device 102 may adjust the size of the first area 400 by adjusting the power for transmitting the signal.

The first external electronic device 102 may transmit signals, through a communication interface of the first external electronic device 102, on the basis of various communication protocols such as Bluetooth, Wi-Fi, ANT, ANT+, ZigBee, NFC, etc. or transmit signals through a connected network. In addition, the first external electronic device 102 may transmit the signal by using light, sound, or an ultrasonic wave.

The signal transmitted from the first external electronic device 102 may be a signal associated with the identification information on the first external electronic device 102. For example, the signal may include identification information on the first external electronic device 102. In addition, the signal may further include time information which is used for the connection between electronic devices which have received signals from the first external electronic device 102.

In addition, the first external electronic device 102 may adjust a transmission distance of a signal depending on the type of information included in the signal. A detailed method for adjusting, by first external electronic device 102, the transmission distance of the signal according to the type of information included in the signal will be described later.

In FIG. 4B, a plurality of second external electronic devices 104-1 and 104-2 located within the first area 400 and the electronic device 101 which has entered the first area 400 are illustrated. Since the plurality of second external electronic devices 104-1 and 104-2 and the electronic device 101 enter into the first area 400, signals associated with the identification information on the first external electronic device 102 may be received from the first external electronic device 102. Hereinafter, it is assumed that the plurality of second external electronic devices 104-1 and 104-2 have entered into the first area 400 before the electronic device 101 enters thereinto.

The plurality of second external electronic devices 104-1 and 104-2 may generate connection information based on the identification information. The connection information may be generated in various formats at least partially based on the identification information. The connection information may be used to establish a connection between electronic devices receiving signals from the first external electronic device 102. The connection information may be generated based on the identification information, and may be generated so as to include at least one of information on each of the plurality of second external electronic devices 104-1 and 104-2 which are used for the connection establishment with another electronic device and information on another electronic device.

The plurality of second external electronic devices 104-1 and 104-2 may set a signal reception time for receiving a connection request from another electronic device on the basis of the information included in the signal received from the electronic device 102. The plurality of second external electronic devices 104-1 and 104-2 may receive a connection request from another electronic device at a predetermined signal reception time.

In an embodiment, in order to prevent a crosstalk of the connection established between a plurality of electronic devices located in the first area 400, the first external electronic device 102 may include, in the signal, time information on a reception time at which each of the plurality of electronic devices receive the connection request.

Accordingly, each of the plurality of second external electronic devices 104-1 and 104-2 for receiving a signal from the first external electronic device 102 may check the time information included in the signal, and may set a time for receiving the connection request on the basis of the time information.

As the electronic device 101 enters into the first area 400 allowing the reception of a signal from the first external electronic device 102, the electronic device 101 may receive a signal associated with identification information on the first external electronic device 102. The electronic device 101 may generate connection information based on the received identification information. The connection information may be generated based on the identification information, and may be generated so as to include at least one of information on the electronic devices 101 which is used for the connection establishment with another electronic device and information on the other electronic device.

The electronic device 101 may establish a connection with at least one of the plurality of second external electronic devices 104-1 and 104-2 based on the connection information. The electronic device 101 may make a request for a connection with at least one of the plurality of second external electronic devices 104-1 and 104-2 and receive the response on the connection request. The electronic device 101 may compare the connection information generated by the electronic device 101 with the connection information generated by at least one of the plurality of second external electronic devices 104-1 and 104-2, which are included in the response. When the connection information generated by at least one of the plurality of second external electronic devices 104-1 and 104-2 and the connection information generated by the electronic device 101 correspond to each other, the electronic device 101 may establish a connection with at least one of the plurality of second external electronic devices 104-1 and 104-2.

Referring to FIG. 4C, the first external electronic device 102 may transmit a signal in a predetermined period T. For example, the first external electronic device 102 may transmit a signal associated with the identification information on the first external electronic device 102 between t0 and t1, and the plurality of second external electronic devices 104-1 and 104-2 may receive the signal. The plurality of second external electronic devices 104-1 and 104-2 may check the period of the signal in response to the reception of the signal. The plurality of second external electronic devices 104-1 and 104-2 may set a time for receiving a signal from the first external electronic device 102 according to the checked period. For example, as shown in FIG. 4C, the plurality of second external electronic devices 104-1 and 104-2 may check the period of the signal in response to the reception of the signal at a time between t0 and t1, and may set a time for receiving the signal from the first external electronic device 102 to a time from t5 to t6.

The plurality of second external electronic devices 104-1 and 104-2 may set a time for receiving a connection request from the electronic device 101 by using time information included in the received signal. For example, the second external electronic device 104-1 may set a time for receiving the connection request from the electronic device 101 to a time from t2 to t3, and the second external electronic device 104-2 may set a time for receiving the connection request from the electronic device 101 to a time from t3 to t4. Each of the plurality of second external electronic devices 104-1 and 104-2 may receive a connection request from the electronic device 101 through a predetermined time for receiving the connection request from the electronic device 101.

In an embodiment, the first external electronic device 102 may transmit the signal in the predetermined period T, and each of the plurality of second external electronic devices 104-1 and 104-2 for receiving the signal may reset a time for receiving the connection request whenever the signal is received. For example, the second external electronic device 104-1 may set a time for receiving the connection request to a time from t7 to t8, and the second external electronic device 104-2 may set a time for receiving the connection request to a time from t8 to t9.

The electronic device 101 may constantly transmit the connection request. For example, the electronic device 101 may transmit the connection request at a time between t1 and t2, a time between t2 and t3, and a time between t3 and t4. Since the connection request transmitted at a time between t1 and t2 does not correspond to a connection request reception time set by the second external electronic device 104-1 and second external electronic device 104-2, the second external electronic device 104-1 and second external electronic device 104-2 do not receive the connection request transmitted at a time between t1 and t2.

Since the connection request transmitted at a time between t2 and t3 corresponds to a connection request reception time set by the second external electronic device 104-1, the second external electronic device 104-1 may receive the connection request. In addition, since the connection request transmitted at a time between t3 and t4 corresponds to a connection request reception time set by the second external electronic device 104-2, the second external electronic device 104-2 may receive the connection request. As described above, the second external electronic device 104-1 and second external electronic device 104-2 may receive a connection request from the electronic device 101 at a connection request reception time set by each second external electronic device. In addition, although not shown, the electronic device 101 may also set a connection request reception time, and may receive the connection request from another external electronic device at the set connection request reception time.

However, as the above descriptions are set forth as examples only and are not intended to be limiting, the time information may not be included in the signal transmitted by the first external electronic device 102, and in this case, an operation of setting time for receiving the connection request, which is performed by each of the plurality of second external electronic devices 104-1 and 104-2 may be omitted.

As described above, the operation of setting the time for receiving the connection request, by each of the plurality of second external electronic devices 104-1 and 104-2 is performed to prevent an occurrence of a crosstalk due to the connection request being concentrated at a particular time in establishing a connection between the electronic devices.

In an embodiment, the plurality of second external electronic devices 104-1 and 104-2 may set a time for randomly receiving the connection request regardless of the signal received from the first external electronic device 102. In this case, both of the second external electronic devices 104-1 and 104-2 may set the time for receiving the connection request at the same timing, for example, a time between t2 and t3. When the second external electronic devices 104-1 and 104-2 set the time for receiving the connection request at the same timing, the electronic device 101 may establish a connection with the second external electronic device which has first transmitted a response according to the connection request at a time between t2 and t3. Then, the electronic device 101 may transmit the connection request again after a predetermined time interval, and, in response thereto, may establish a connection with the other second external electronic devices.

In addition, the second external electronic devices 104-1 and 104-2 may also set different times for receiving a connection request, respectively, as shown in FIG. 4C, and in this case, since a process for establishing a connection between the second external electronic devices 104-1 and 104-2 is the same as that described in FIG. 4C, a separate description will be omitted.

Figure 5A:
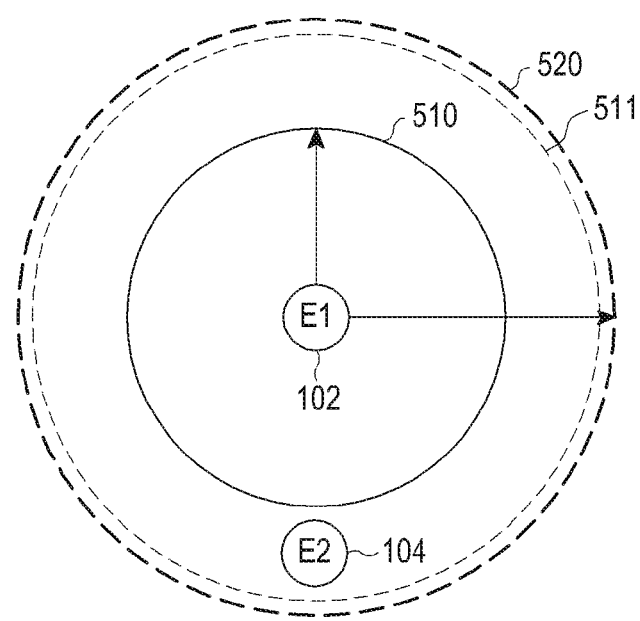
FIGS. 5A and 5B illustrate a method for establishing a connection between an electronic device and a second external electronic device when a plurality of signals are transmitted by a first external electronic device, according to various embodiments of the present disclosure.
Figure 5B:
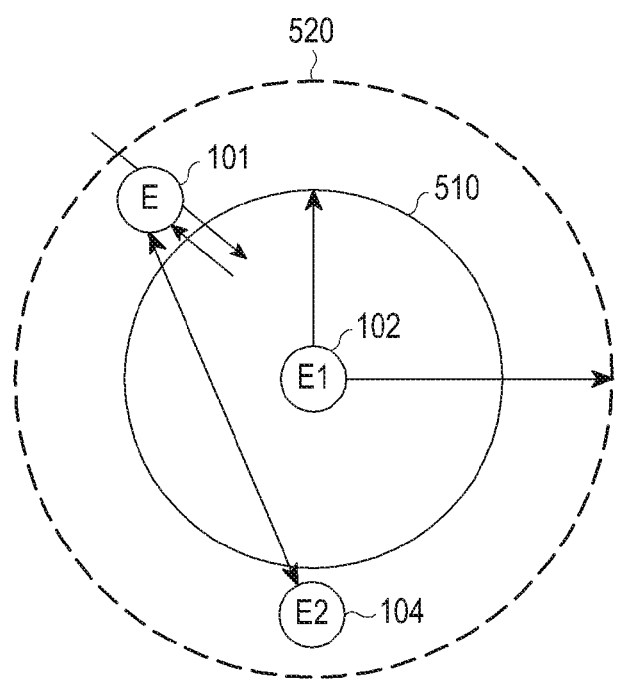

FIGS. 5A and 5B illustrate a method for establishing a connection between an electronic device and a second external electronic device when a plurality of signals are transmitted by a first external electronic device according to various embodiments of the present disclosure.

As shown in FIG. 5A, the first external electronic device 102 may transmit a first signal and a second signal, each of which includes different pieces of information. Hereinafter, for convenience of explanation, it is assumed that the first signal includes identification information on the electronic device 101 which is used for generating connection information, and the second signal includes time information for setting the signal transmission and reception time.

In an embodiment, the first external electronic device 102 may adjust power of a communication interface through which each signal is transmitted such that the first signal is transmitted into a first area 510 and the second signal is transmitted into a second area 520. The first external electronic device 102 may adjust power of the communication interface such that an arrival distance of the first signal is shorter than an arrival distance of the second signal. However, in this case, as shown in FIG. 5A, when only a second signal may be received from the first external electronic device 102, the first signal may not be received by the second external electronic device 104 so that the connection information may not be generated.

Accordingly, the first external electronic device 102 may increase the arrival distance of the first signal so as to allow the second external electronic device 104 to generate the connection information. The first external electronic device 102 may increase the transmission power of the communication interface through which the first signal is transmitted, in order to increase the arrival distance of the first signal.

For example, as shown in FIG. 5A, the first external electronic device 102 may adjust power of the communication interface to increase the arrival distance of the first signal, so that a first area 510 allowing the reception of the first signal may be enlarged to a third area 511. Accordingly, the second external electronic device 104 may receive a first signal and generate connection information by using identification information included in the received first signal. Since the generated connection information is not dissipated, the second external electronic device 104 may establish a connection with another external electronic device which has received the first signal as long as the identification information included in the first signal does not change. The first external electronic device 102 may return the adjusted power of the communication interface to the original state after a predetermined time has passed. Accordingly, an area allowing the reception of the first signal may be reduced from the third area 511 to the first area 510.

In FIG. 5B, as described above, a case where the second external electronic device 104 receives the first signal from the first external electronic device 102 and generates the connection information and then the electronic device 101 enters a second area 520 is illustrated.

As shown in FIG. 5B, when the electronic device 101 enters a second area 520, the first signal may not be received from the first external electronic device 102. Accordingly, since the electronic device 101 may not generate connection information based on the identification information included in the first signal, the electronic device 101 may not establish a connection with the second external electronic device 104. Accordingly, the electronic device 101 may enter into the first area 510 to establish the connection with the second external electronic device 104. As the electronic device 101 enters into the first area 510, the electronic device 101 may receive the first signal from the first external electronic device 102. Although the electronic device 101 deviates from the first area 510 after generating the connection information, the electronic device 101 may establish the connection with the second external electronic device 104 by using the generated connection information.

Thus, the first external electronic device 102 may transmit a plurality of signals including different pieces of information so as to have different arrival distances. In this case, when the electronic device 101 enters an area allowing the reception of some signals from the first external electronic device 102, the connection information may not be generated. In order to generate the connection information, the electronic device 101 may enter an area where a signal including identification information which is used for generating the connection information is transmitted.

Figure 6:
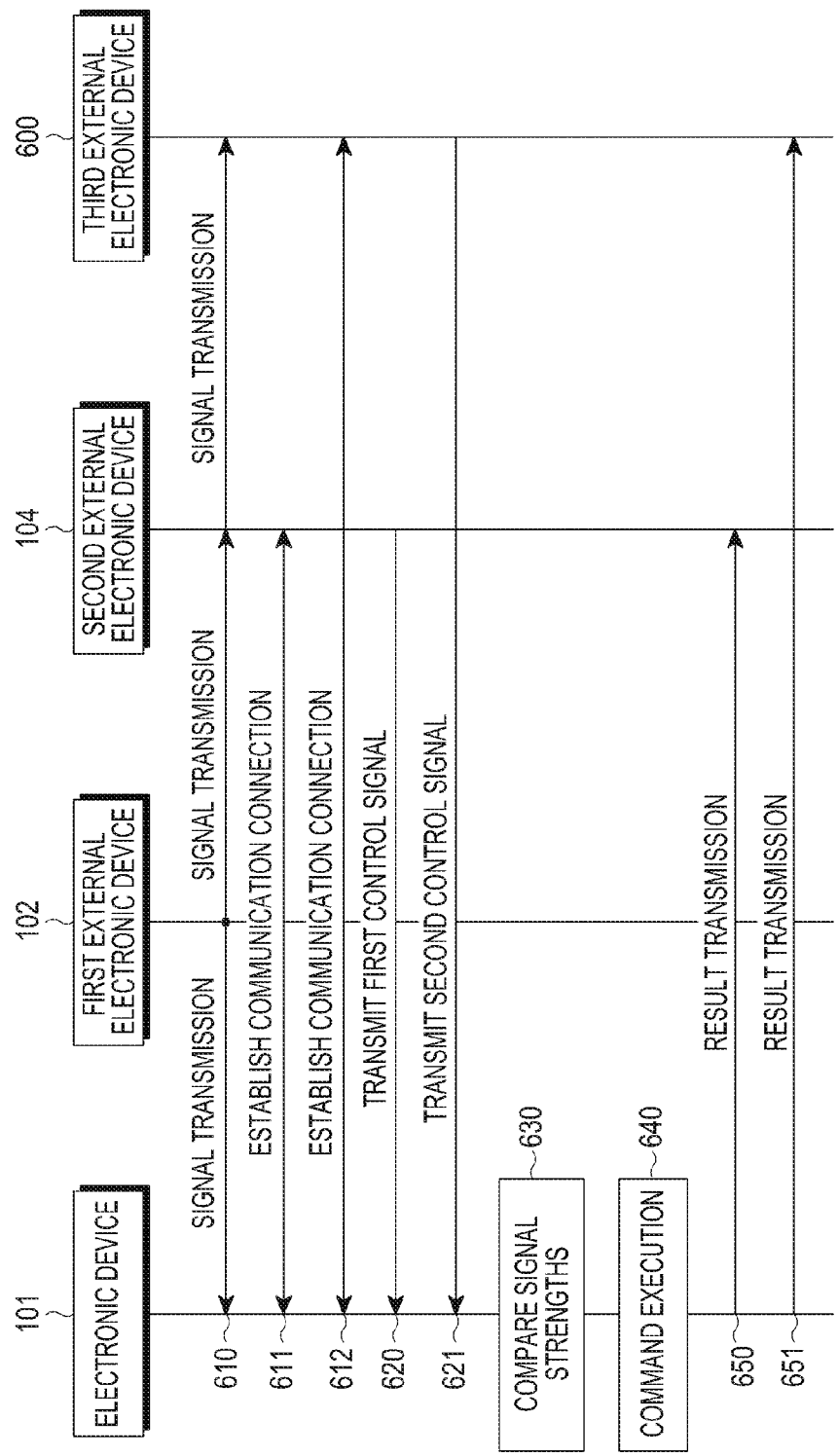
FIG. 6 illustrates a flowchart of a method for performing, by an electronic device, an operation according to a control signal which is received from each of the plurality of external electronic devices according to various embodiments of the present disclosure.

FIG. 6 is a flowchart illustrating a method for performing, by an electronic device, an operation according to a control signal which is received from each of the plurality of external electronic devices according to various embodiments of the present disclosure.

In operation 610, the first external electronic device 102 may transmit a signal based on various communication protocols. In addition, the first external electronic device 102 may transmit the signal by using light or sound. The first external electronic device 102 may periodically transmit a signal in various formats or transmit the signal when a specific event occurs. In FIG. 6, it is assumed that the second external electronic device 104 and the third external electronic device 600 receive a signal associated with the identification information from the first external electronic device 102 to generate the connection information before the electronic device 101 enters an area allowing the reception of signals from the first external electronic device 102. Accordingly, for the convenience of explanation, a detailed description of an operation for receiving the signal from the first external electronic device 102 by the second external electronic device 104 and the third external electronic device 600 to generate the connection information will be omitted.

In operation 611 and operation 612, the electronic device 101 may establish a connection with the second external electronic device 104 and third external electronic device 600 based on the signal received from the first external electronic device 102. A detailed method for establishing a connection with the second external electronic device 104 and third external electronic device 600 will be omitted, because a detailed operation thereof is the same as the method described in FIG. 3.

In operation 620 and operation 621, each of the second external electronic device 104 and the third external electronic device 600 may transmit the first control signal and second control signal for controlling the electronic device 101 to the electronic device 101.

In operation 630, when a plurality of control signals are received, the electronic device 101 may compare signal strengths of the received plurality of control signals. Accordingly, the processor 120 may compare the signal strengths of the first control signal and second control signal.

In operation 640, the electronic device 101 may execute a command corresponding to a control signal having a signal strength greater than the other one between the first control signal and second control signal.

In operation 650 and operation 651, the electronic device 101 may transmit the result of operation performance according to the control signal to each of the second external electronic device 104 and the third external electronic device 600. For example, when the signal strength of the first control signal is greater than the signal strength of the second control signal, the electronic device 101 may transmit, to the second external electronic device 104, the result of execution of a command corresponding to the first control signal and transmit, to the third external electronic device 600, the result indicating that a command corresponding to the second control signal is not executed.

Figure 7:
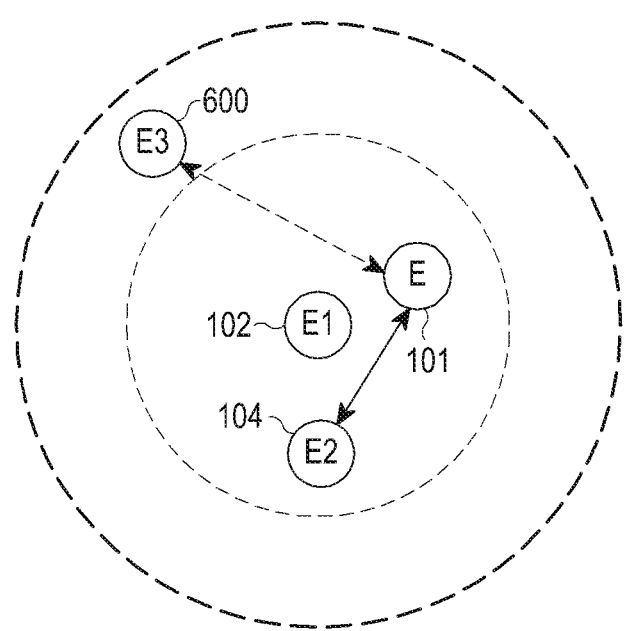
FIG. 7 illustrates a flowchart of a method for performing, by an electronic device, an operation according to a control signal which is received from each of the plurality of external electronic devices according to various embodiments of the present disclosure.

FIG. 7 is a flowchart illustrating a method for performing, by an electronic device, an operation according to a control signal which is received from each of the plurality of external electronic devices according to various embodiments of the present disclosure.

The electronic device 101 may establish a connection with the second external electronic device 104 and third external electronic device 600 on the basis of a signal received from the first external electronic device 102, and may receive a first control signal and a second control signal from the second external electronic device 104 and the third external electronic device 600, respectively.

As shown in FIG. 7, since the second external electronic device 104 is closer to the electronic device 101 than the third external electronic device 600, the signal strength of the first control signal which is transmitted by the second external electronic device 104 is greater than the signal strength of the second control signal which is transmitted by the third external electronic device 600.

Accordingly, the electronic device 101 may compare the signal strengths of the first control signal and the second control signal, and may execute a command corresponding to the first control signal having a signal strength greater than the second control signal and may not execute a command corresponding to the second control signal.

Therefore, when control signals are received from the plurality of external electronic devices, the electronic device 101 may process the control signals by determining the priorities thereof. As described above, control signals to be processed may be determined based on the signal strengths of the received control signals, and control signals to be processed may be determined based on the information included in the control signals. A method for determining the priorities for processing the control signals may be set in various methods.

Figure 8:
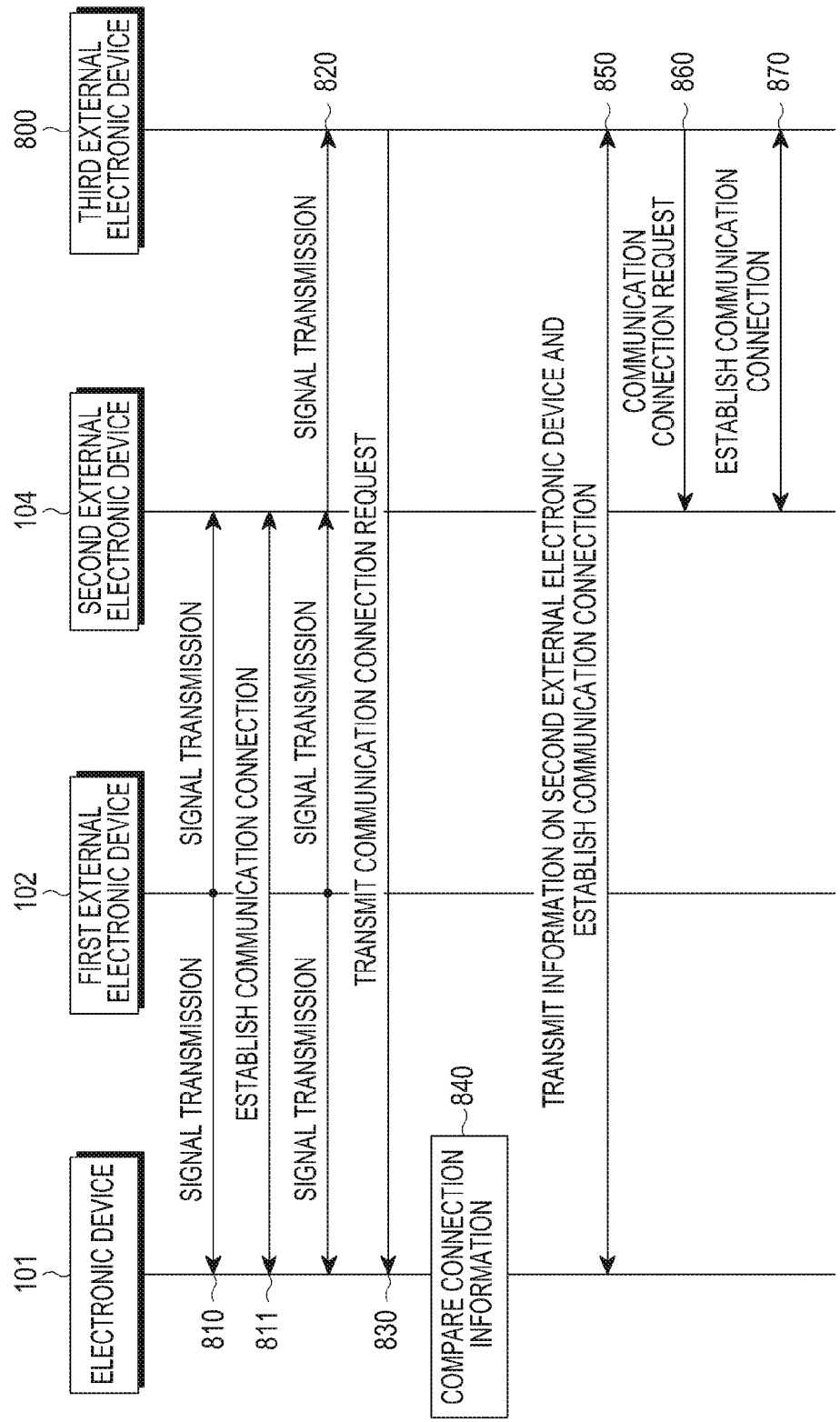
FIG. 8 illustrates a flowchart of a method for sharing information on an external electronic device which has a connection established with an electronic device according to various embodiments of the present disclosure.

FIG. 8 is a flowchart illustrating a method for sharing information on an external electronic device which has a connection established with an electronic device according to various embodiments of the present disclosure.

In operation 810, the first external electronic device 102 may transmit a signal based on various communication protocols. In addition, the first external electronic device 102 may transmit the signal by using light or sound. The first external electronic device 102 may periodically transmit a signal in various formats or transmit the signal when a specific event occurs.

In operation 811, the electronic device 101 may establish a connection with the second external electronic device 104 based on the signal received from the first external electronic device 102. A detailed method for establishing a connection with the second external electronic device 104 by the electronic device 101 will be omitted, because a detailed operation thereof is the same as the method described in FIG. 3.

In operation 820, the first external electronic device 102 may transmit a signal according to a predetermined period or when a specific event occurs. For example, the first external electronic device 102 may transmit the signal when a predetermined period has passed after transmitting the signal in operation 810. In addition, the first external electronic device 102 detects whether a user of the third external electronic device 800 has access, and when it is detected that the user of the third external electronic device 800 has achieved access, the first external electronic device 102 may transmit the signal. Hereinafter, it is assumed that the third external electronic device 800 enters an area allowing the reception of signals from the first external electronic device 102 after transmitting the signal by the first external electronic device 102 in operation 810.

In operation 830, the third external electronic device 800 may generate the connection information based on a signal transmitted from the first external electronic device 102, and may transmit a connection request to the electronic device 101 by performing a search operation according to a communication method for connection establishment. Further, the third external electronic device 800 may include, in the connection request, the generated connection information and a request for sharing information on other external electronic devices which have established connections with the electronic device 101.

In operation 840, the electronic device 101 may compare the connection information included in the connection request received from the third external electronic device 800 with the connection information generated by the electronic device 101.

In operation 850, when the connection information included in the connection request received from the third external electronic device 800 and the connection information generated by the electronic device 101 correspond to each other, the electronic device 101 may establish a connection with the third external electronic device 800. In addition, the electronic device 101 may transmit, to the third external electronic device 800, information on the second external electronic device 104 which has a connection established with the electronic device 101.

In operation 860, the third external electronic device 800 may request for a connection to the second external electronic device 104 based on information on the second external electronic device 104, which is received from the electronic device 101, and in operation 870, the third external electronic device 800 may establish the connection with the second external electronic device 104.

Thus, the third external electronic device 800 may easily perform a connection establishment operation with the second external electronic device 104, using the information on the second external electronic device 104 received from the electronic device 101.

Figure 9A:
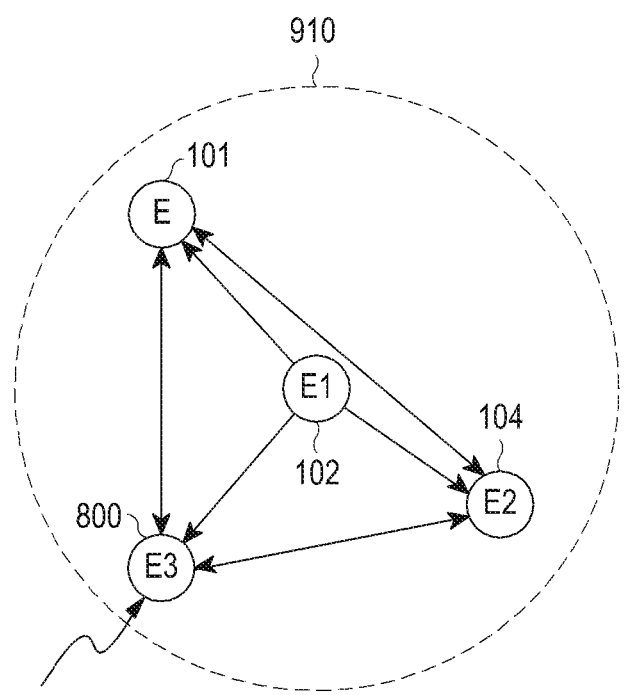
FIGS. 9A and 9B illustrate flowcharts of a method for sharing information on an external electronic device which has a connection established with an electronic device according to various embodiments of the present disclosure.
Figure 9B:
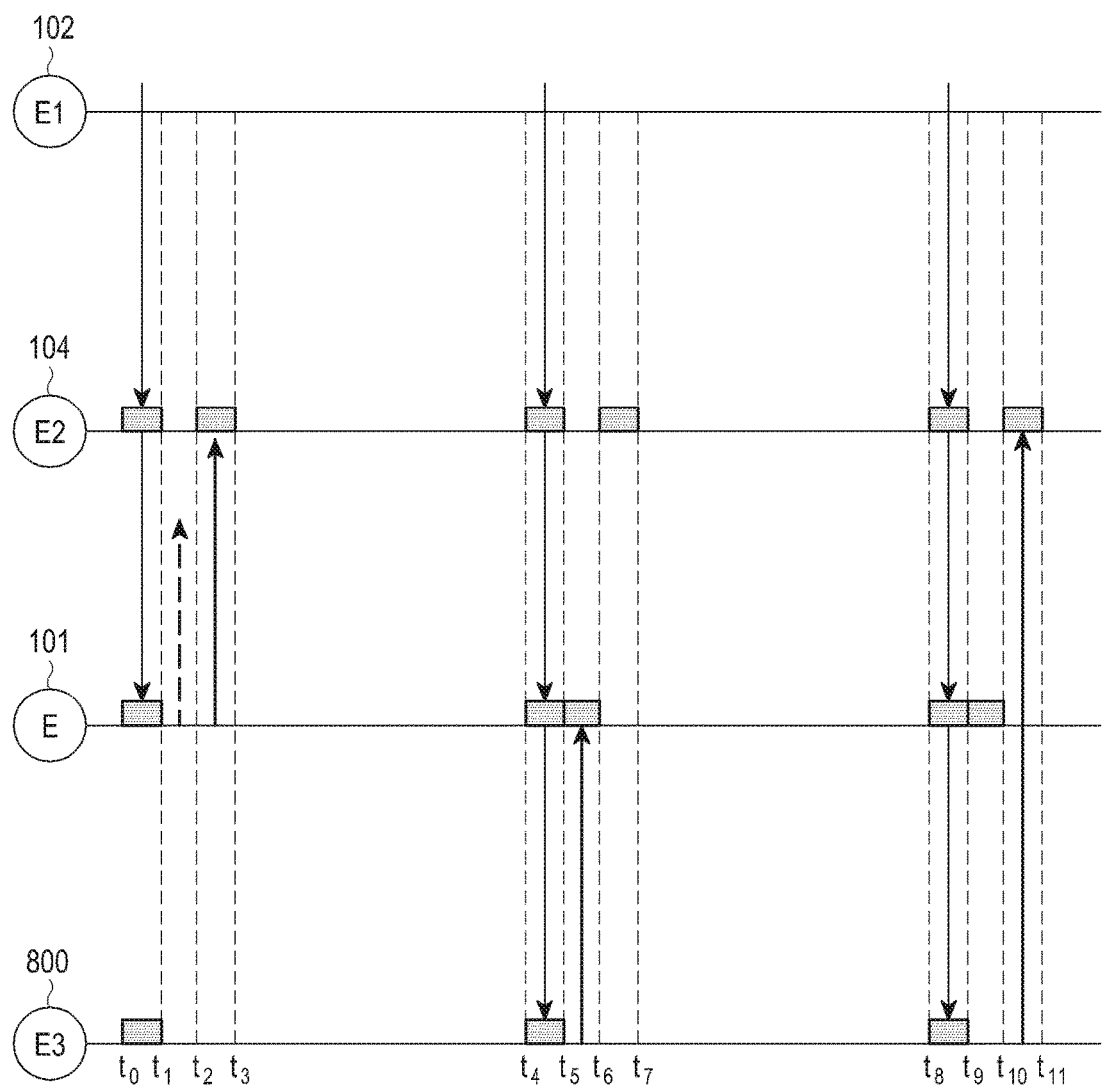

FIGS. 9A and 9B are flowcharts illustrating a method for sharing information on an external electronic device which has a connection established with an electronic device according to various embodiments of the present disclosure.

As shown in FIG. 9A, the electronic device 101 may establish a connection with the second external electronic device 104 based on the signal received from the first external electronic device 102. Then, the third external electronic device 800 may enter into a first area 910 allowing the reception of signals from the first external electronic device 102. As the electronic device 800 enters into the first area 910, the electronic device 101 may receive the first signal from the first external electronic device 102 to generate connection information.

The third external electronic device 800 may transmit a connection request to the electronic device 101. Further, the third external electronic device 800 may include, in the connection request, the generated connection information and a request for sharing information on other external electronic devices which have established connections with the electronic device 101.

The third external electronic device 800 may establish a connection with the electronic device 101 in response to the request from the electronic device 101, and may transmit information on the second external electronic device 104 which has a connection established with the electronic device 101.

The third external electronic device 800 may establish a connection with the second external electronic device 104, based on the information on the second external electronic device 104, which has been received from the electronic device 101.

As shown in FIG. 9B, the first external electronic device 102 may transmit a signal at a time between t0 and t1, and the second external electronic device 104 and the electronic device 101 may receive the signal and generate connection information. As the electronic device 101 generates the connection information, a connection request may be transmitted. The second external electronic device 104 may set a time for receiving the connection request to a time between t2 and t3, based on the time information included in the signal received from the first external electronic device 102, and may establish a connection with the electronic device 101 according to the connection request from the electronic device 101, which has been received at a time between t2 and t3.

The first external electronic device 102 may transmit again a signal at a time between t4 and t5 according to a predetermined period. In addition, the first external electronic device 102 may detect whether the user of the third external electronic device 800 has access, and may transmit again a signal.

The third external electronic device 800 may generate connection information based on a signal received from the first external electronic device 102, and transmit the connection request to the electronic device 101. The electronic device 101 may set a time for receiving the connection request to a time from t5 to t6, based on the time information included in the signal received from the first external electronic device 102, and may establish a connection with the third external electronic device 800 according to the connection request received from the third external electronic device 800 at a time between t5 and t6.

Further, the third external electronic device 800 may include, in the connection request, the generated connection information and a request for sharing information on other external electronic devices which have established connections with the electronic device 101. Accordingly, the electronic device 101 may transmit, to the third external electronic device 800, information on the second external electronic device 104 which has established the connection with the electronic device 101.

The third external electronic device 800 may receive information on the second external electronic device 104 from the electronic device 101, and may request for a connection to the second external electronic device 104 at a next connection request transmission period. The second external electronic device 104 may set a time for requesting a connection request to a time from t10 to t11 based on the time information included in the signal received from the first external electronic device 102, and may establish a connection with the electronic device 101 according to the connection request received at a time between t10 and t11 from the electronic device 101.

However, the above descriptions are set forth as examples only, but not limited thereto, the time information may not be included in the signal transmitted by the first external electronic device 102, and in this case, an operation of setting a time for receiving the connection request, which is performed by each of the electronic device 101 and the second external electronic device 104 may be omitted.

Figure 10A:
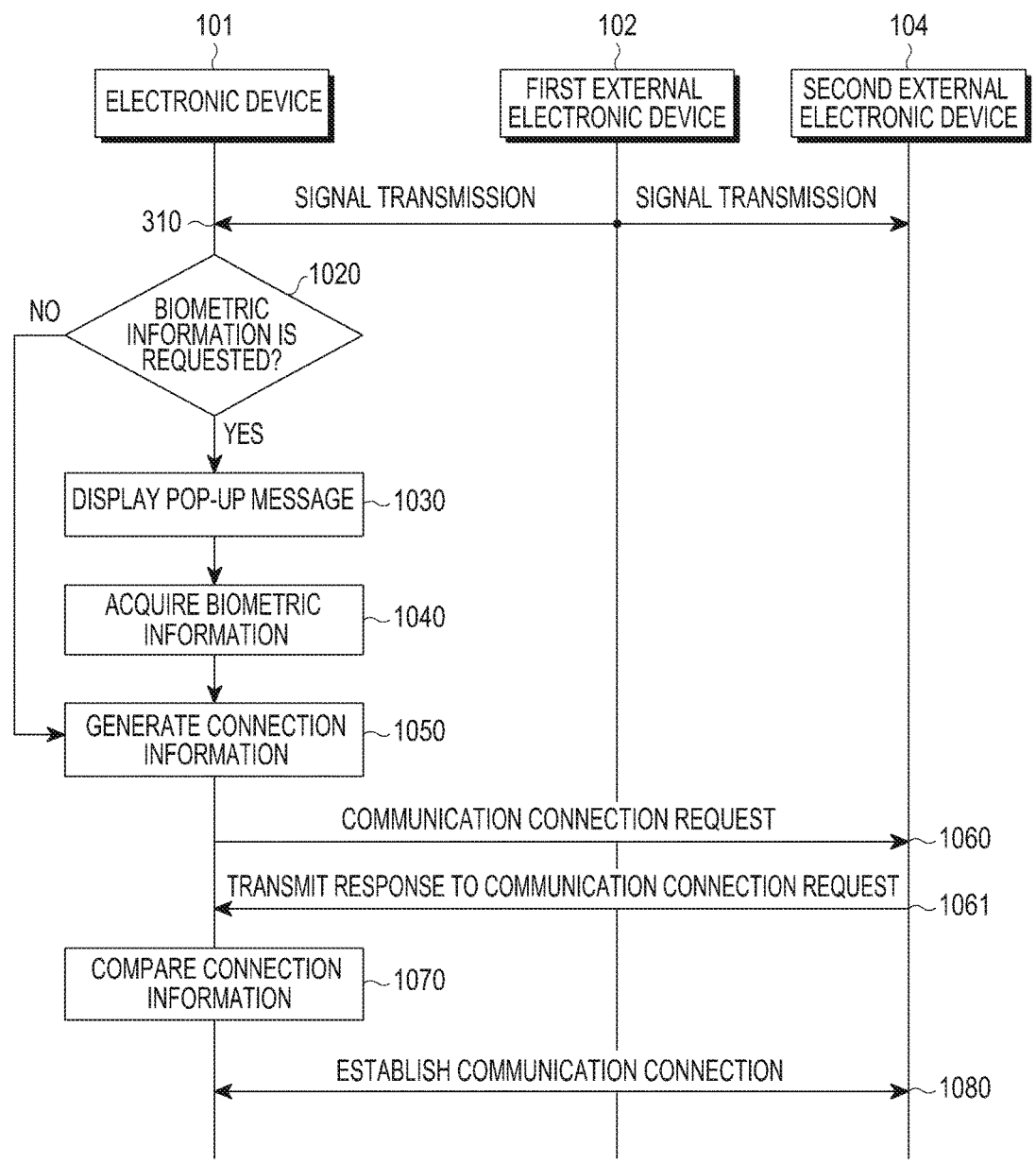
FIG. 10A illustrates a flowchart of a method for establishing, by an electronic device, a connection with an external electronic device, using biometric information according to various embodiments of the present disclosure.

FIG. 10A is a flowchart illustrating a method for establishing a connection with an external electronic device, using biometric information by an electronic device according to various embodiments of the present disclosure.

In operation 1010, the first external electronic device 102 may transmit a signal based on various communication protocols. In addition, the first external electronic device 102 may transmit the signal by using light or sound. The first external electronic device 102 may generate a signal in which information, an indicator, and the like associated with a bio-signal are included and transmit the same.

In operation 1020, the electronic device 101 may determine whether the user biometric information is requested to establish a connection with another external electronic device, based on the signal received from the first external electronic device 102.

The electronic device 101 may check the information, indicator, and the like associated with a bio-signal included in the signal received from the first external electronic device 102, through which it may be determined whether the user biometric information is requested to establish the connection with external electronic devices which transmit signals to the first external electronic device 102.

When it is determined that the user biometric information is not requested to establish a connection with other external electronic devices, the electronic device 101 may generate the connection information by using only the identification information included in the signal.

Figure 10B:
FIG. 10B illustrates an electronic device which displays a pop-up message requiring user biometric information according to various embodiments of the present disclosure.

In operation 1030, when it is determined that the user biometric information is requested to establish the connection with other external electronic devices, the electronic device 101 may display, on the display 160 of the electronic device 101, a pop-up message requesting the user biometric information, as shown in FIG. 10B, or may output a voice requesting the user biometric information through a speaker.

In operation 1040, the electronic device 101 may acquire the user biometric information through a sensor for measuring the user biometric information included in the electronic device 101. Here, the user biometric information may include all pieces of biometric information which can be available for identifying the user, such as body temperature, heart rate, fingerprint, iris, voice, etc.

In operation 1050, the electronic device 101 may generate the connection information based on the user biometric information acquired through a sensor and identification information included in the signal acquired from the first external electronic device 102.

In operation 1060, the electronic device 101 may make a request for a connection to the second external electronic device 104. In operation 1061, the second external electronic device 104 may transmit a response for the connection request to the electronic device 101 according to the connection request received from the electronic device 101. The response for the connection request may include identification information included in the signal received, by the second external electronic device 104, from the first external electronic device 102 and connection information generated using the user biometric information.

In addition, the second external electronic device 104 may also determine whether the user biometric information is requested based on the signal received from the first external electronic device 102, and may generate connection information using the acquired user biometric information and the identification information included in the signal. The second external electronic device 104 may acquire the user biometric information by using a sensor included in the second external electronic device 104. In addition, the first external electronic device 102 may acquire the user biometric information through a sensor included in the first external electronic device 102 or a sensor located in an area allowing the reception of signals from the first external electronic device 102, and may share the acquired user biometric information with the second external electronic device 104.

In operation 1070, the electronic device 101 may compare the connection information generated by the electronic device 101 in operation 320 with the connection information generated by the electronic device 102, which is included in the response received from the second external electronic device 104. In a process of comparing the two pieces of connection information, the electronic device 101 may further include an operation of comparing the user biometric information included in each piece of connection information. FIG. 10A illustrates that an operation 1070 is performed by the electronic device 101, but it is not limited thereto, and the second external electronic device 104 may also perform operation 1070. In this case, in operation 1060, the electronic device 101 may include the connection information in the communication connection request and transmit the same to the second external electronic device 104.

In operation 1080, when the connection information generated by the second external electronic device 104 and the connection information generated by the electronic device 101 correspond to each other, the electronic device 101 may establish a connection with the second external electronic device 104. The electronic device 101 may determine whether not only identification information used in the generation of each piece of connection information is identical, but also whether the user biometric information is identical, so that the electronic device 101 may determine whether connection information generated by the second external electronic device 104 and connection information generated by the electronic device 101 correspond to each other.

Figure 11:
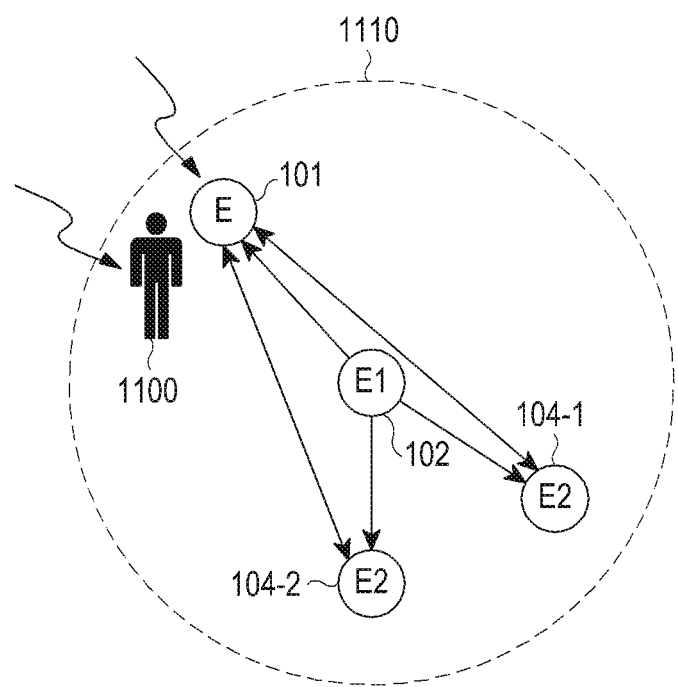
FIG. 11 illustrates a method for illustrating a signal transmission method by a first external electronic device according to various embodiments of the present disclosure.

FIG. 11 illustrates a method for illustrating a signal transmission method by a first external electronic device according to various embodiments of the present disclosure.

As shown in FIG. 11, when it is identified, through a sensor, that a user 1100 enters into a first area 1110, the first external electronic device 102 may determine that the user 1100 is closer and transmit a signal. For example, the first external electronic device 102 may determine that the user has entered into the first area 1110, through a proximity sensor, sound sensor or the like.

In addition, in an embodiment, the first external electronic device 102 may transmit Wi-Fi signals through the communication interface 170, sense the reflected Wi-Fi signals through the sensor, and analyze snapshots of the sensed signals, so that it can be determined whether the user enters into the first area 1110. In addition, the first external electronic device 102 may detect the user's breathing pattern and a heart rate through the signal sensed through the sensor.

Therefore, when it is determined that the user has access, that is, when it is determined that a specific event occurs, the first external electronic device 102 may transmit the signal.

Figure 12:
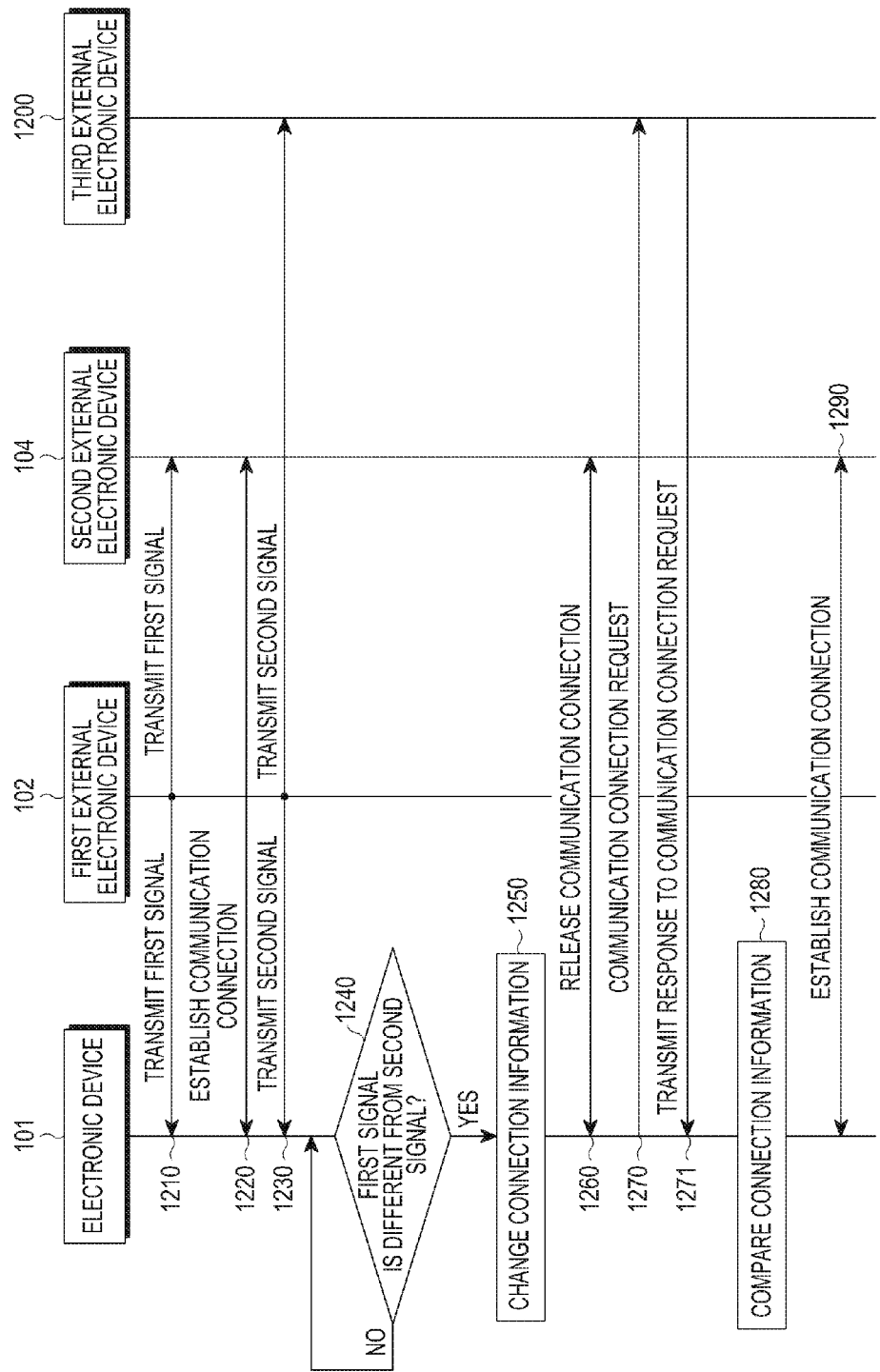
FIG. 12 illustrates a flowchart of a method for changing connection information by an electronic device according to various embodiments of the present disclosure.

FIG. 12 is a flowchart illustrating a method for changing connection information by an electronic device according to various embodiments of the present disclosure.

In FIG. 12, it is assumed that the second external electronic device 104 generates connection information based on identification information included in a first signal, and the third external electronic device 1200 generates connection information based on identification information included in a second signal.

In operation 1210, the first external electronic device 102 may transmit the first signal on the basis of various communication protocols. In addition, the first external electronic device 102 may transmit the first signal by using light or sound.

In operation 1220, the electronic device 101 may establish a connection with the second external electronic device 104 based on the first signal received from the first external electronic device 102. A detailed method for establishing a connection with the second external electronic device 104 by the electronic device 101 will be omitted, because a detailed operation thereof is the same as the method described in FIG. 3.

In operation 1230, the first external electronic device 102 may transmit a second signal on the basis of various communication protocols. In addition, the first external electronic device 102 may transmit the second signal by using a light or sound. The second signal may include identification information at least in part different from the identification information included in the first signal.

In operation 1240, the electronic device 101 may determine whether the identification information included in the first signal is different from the identification information included in the second signal. For example, when the identification information included in the first signal is entirely different from the identification information included in the second signal, or some of the identification information that is used for generating connection information is different from each other, the electronic device 101 may determine that the identification information included in the first signal is different from the identification information included in the second signal. When it is determined that the identification information included in the first signal is the same as the identification information included in the second signal, the electronic device 101 may retain the connection information generated based on the identification information included in the first signal.

In operation 1250, when the identification information included in the first signal is different from the identification information included in the second signal, the electronic device 101 may change the generated connection information.

In operation 1260, when the connection information changed in operation 1250 does not correspond to the connection information generated by the second external electronic device 104, the electronic device 101 may release the established connection.

In operation 1270, the electronic device 101 may request for a connection to the third external electronic device 1200 in order to establish a connection with another external electronic device based on the changed connection information.

In operation 1271, the third external electronic device 1200 may transmit a response for the connection request to the electronic device 101 according to the connection request received from the electronic device 101. The response to the connection request may include connection information generated by the third external electronic device 1200 based on the identification information included in the second signal.

In operation 1280, the electronic device 101 may compare the connection information generated by the electronic device 101 in operation 1250 with the connection information generated by the third external electronic device 1200, which is included in the response received from the third external electronic device 1200.

In operation 1290, when the connection information generated by the third external electronic device 1200 and the connection information generated by the electronic device 101 correspond to each other, the electronic device 101 may establish a connection with the third external electronic device 1200.

As the identification information included in the signal transmitted by the first external electronic device 102 is changed, the electronic device 101 may change the connection information, and establish or release a connection with another external electronic device based on the changed connection information.

Figure 13:
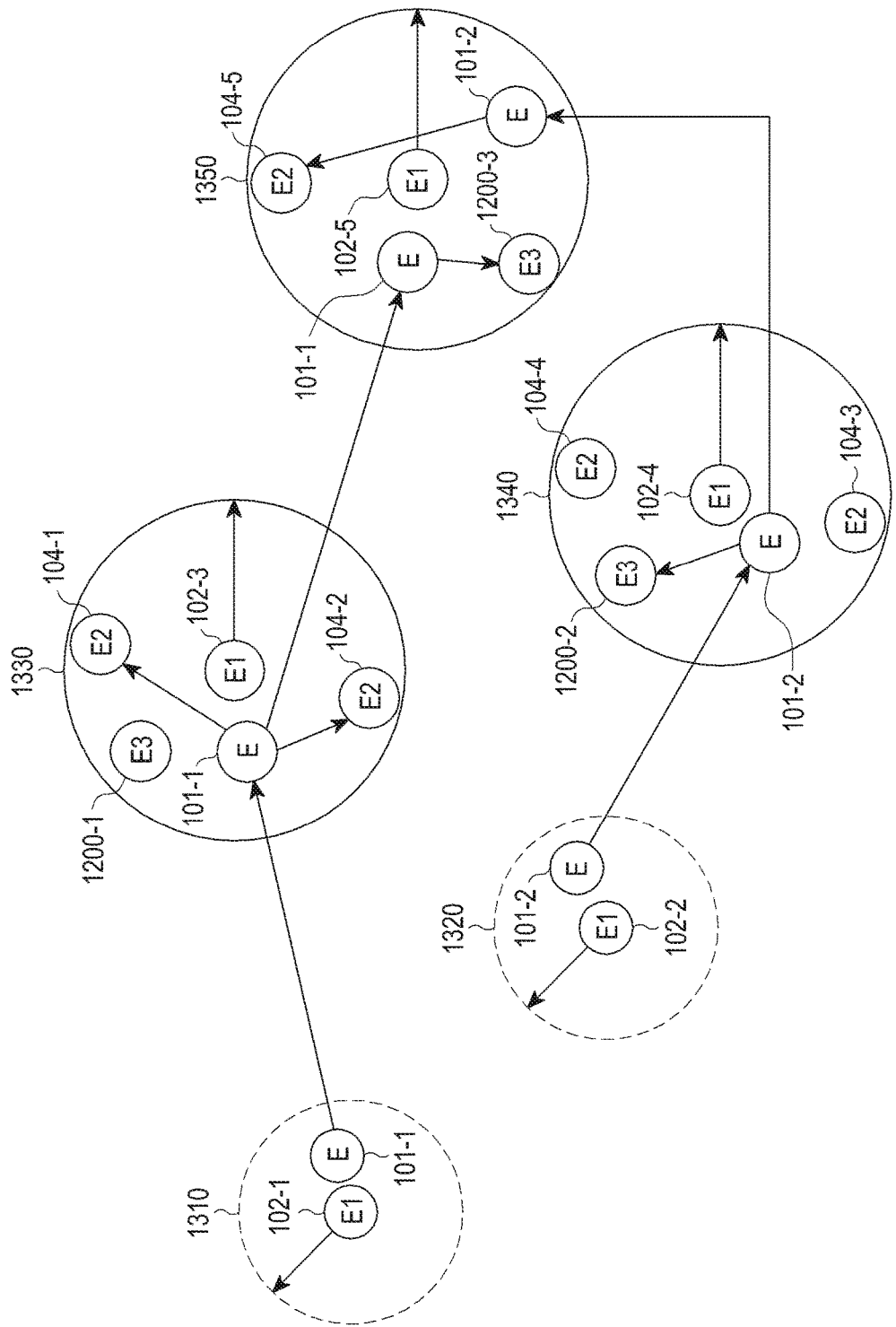
FIG. 13 illustrates a flowchart of a method for changing connection information by an electronic device according to various embodiments of the present disclosure.

FIG. 13 is a flowchart illustrating a method for changing connection information by an electronic device according to various embodiments of the present disclosure.

In FIG. 13, it is assumed that an electronic device 101-1 is network connected to a first external electronic device 102-1 and the electronic device 101-2 is network connected to a first external electronic device 102-2, so as to receive signals, respectively. In addition, it is assumed that the first external electronic device 102-1 transmits a first signal including first identification information on the first external electronic device 102-1, the first external electronic device 102-2 transmits a second signal including second identification information on the first external electronic device 102-2, and each piece of identification information included in the first signal and the second signal is different from one another.

In addition, second external electronic devices 104-1, 104-2, 104-3, 104-4, and 104-5 may generate connection information, on the basis of first identification information included in the first signal received from a first external electronic device 102-1, and the first external electronic device 102-1 may be network connected to first external electronic devices 102-3, 102-4, and 102-5 and transmit the first signal including the first identification information to the second external electronic devices 104-1, 104-2, 104-3, 104-4, and 104-5 through the first external electronic devices 102-3, 102-4, and 102-5.

Meanwhile, third external electronic devices 1200-1, 1200-2, and 1200-3 generate connection information, on the basis of second identification information included in the second signal received from the first external electronic device 102-2, and the first external electronic device 102-2 may be network connected to the first external electronic devices 102-3, 102-4, and 102-5 and transmit the second signal including the second identification information to the third external electronic devices 1200-1, 1200-2, and 1200-3 through the first external electronic devices 102-3, 102-4, and 102-5.

Hereinafter, for convenience of description, it is described that the first external electronic devices 102-3, 102-4, and 102-5 transmit signals including time information for setting the signal transmission and reception time without including identification information, after the second external electronic devices 104-1, 104-2, 104-3, 104-4, and 104-5 and the third external electronic devices 1200-1, 1200-2, and 1200-3 generate the connection information. Accordingly, the second external electronic devices 104-1 and 104-2, 104-3, 104-4, and 104-5 and third external electronic devices 1200-1, 1200-2, and 1200-3 do not change the connection information after the first connection information has been created.

The electronic device 101-1 may enter into a first area 1310 allowing the reception of the first signal from the first external electronic device 102-1 so as to receive the first signal from the first external electronic device 102-1. The electronic device 101-1 may generate connection information on the basis of the first identification information included in the received first signal.

Then, the electronic device 101-1 may enter into a third area 1330 allowing the reception of signals from the first external electronic device 102-3. In this case, the electronic device 101-1 may establish a connection with the second external electronic devices 104-1 and 104-2 which have generated the connection information on the basis of the first identification information included in the first signal, among external electronic devices located within the third area 1330. The electronic device 101-1 may not establish a connection with the third external electronic device 1200-1 which has generated connection information on the basis of the second identification information included in the second signal.

Then, when a signal transmitted by the first external electronic device 102-1 is changed from the first signal to the second signal, the first external electronic device 102-1 may transmit the second signal to the electronic device 101-1 through a network. As the electronic device 101-1 receives the second signal, it may change the connection information generated based on the first identification information included in the first signal, on the basis of the second identification information included in the second signal. As the connection information is changed, the electronic device 101-1 may release the connection with the second external electronic devices 104-1 and 104-2 with which the connection has been established, and establish a connection with the third external electronic device 1200-1.

Then, the electronic device 101-1 may enter into a fifth area 1350 allowing the reception of signals from the first external electronic device 102-5. In this case, the electronic device 101-1 may establish a connection with the third external electronic device 1200-3 which has generated connection information on the basis of the second identification information included in the second signal, among external electronic devices located within a fifth area 1350. The electronic device 101-1 may not establish a connection with the second external electronic device 104-5 which has generated connection information on the basis of the first identification information included in the first signal.

Meanwhile, the electronic device 101-2 may enter into a second area 1320 allowing the reception of the second signal from the first external electronic device 102-2 so as to receive the second signal from the first external electronic device 102-2. The electronic device 101-2 may generate connection information on the basis of the second identification information included in the received second signal.

Then, the electronic device 101-2 may enter into a fourth area 1340 allowing the reception of signals from the first external electronic device 102-4. In this case, the electronic device 101-2 may establish a connection with the third external electronic devices 1200-2 which has generated connection information on the basis of the second identification information included in the second signal, among external electronic devices located within a fourth area 1340. The electronic device 101-2 may not establish a connection with the second external electronic devices 104-3 and 104-4 which have generated the connection information on the basis of the first identification information included in the first signal.

Then, when a signal transmitted by the first external electronic device 102-2 is changed from the second signal to the first signal, the first external electronic device 102-2 may transmit the first signal to the electronic device 101-2 through a network. As the electronic device 101-2 receives the first signal, it may change the connection information generated based on the second identification information included in the second signal on the basis of the first identification information included in the first signal. As the connection information is changed, the electronic device 101-2 may release the connection with the third external electronic device 1200-2 with which the connection has been established, and establish a connection with the second external electronic devices 104-3 and 104-4.

Then, the electronic device 101-2 may enter into a fifth area 1350 allowing the reception of signals from the first external electronic device 102-5. In this case, the electronic device 101-2 may establish a connection with the second external electronic devices 104-5 which has generated connection information on the basis of the first identification information included in the first signal, among external electronic devices located within a fifth area 1350. The electronic device 101-2 may not establish a connection with the third external electronic device 1200-3 which has generated connection information on the basis of the second identification information included in the second signal.

Thus, as signals received from the first external electronic devices 102-1 and 102-2 have changed, the electronic devices 101-1 and 101-2 may change the generated connection information, and may release the existing connection and establish a new connection depending on the change of the connection information. In addition, as described above, the electronic devices 101-1 and 101-2, the second external electronic devices 104-1, 104-2, 104-3, 104-4, and 104-5, and the third external electronic devices 1200-1, 1200-2, and 1200-3 may directly receive signals at a short distance from the first external electronic devices 102-1 and 102-2 and receive signals, through a network, at an area out of a short range communication area.

FIG. 14 is a block diagram of an electronic device 1401 according to various embodiments. The electronic device 1401 may include, for example, the entirety or a part of the electronic device 101 illustrated in FIG. 1. The electronic device 1401 may include at least one Application Processor (AP or processor) 1410, a communication module 1420, a Subscriber Identification Module 1424, a memory 1430, a sensor module 1440, an input device 1450, a display 1460, an interface 1470, an audio module 1480, a camera module 1491, a power management module 1495, a battery 1496, an indicator 1497, and a motor 1498.

The processor 1410 may drive, for example, an operating system or application programs to control a plurality of hardware or software elements connected thereto and may perform various types of data processing and operations. The processor 1410 may be embodied, for example, as a System on Chip (SoC). According to an embodiment, the processor 1410 may further include a Graphic Processing Unit (GPU) and/or an image signal processor. The processor 1410 may also include at least some (for example, a cellular module 1421) of the elements illustrated in FIG. 14. The processor 1410 may load, in a volatile memory, instructions or data received from at least one of the other elements (for example, a non-volatile memory) to process the loaded instructions or data, and may store various types of data in the non-volatile memory.

The communication module 1420 may have a configuration that is the same as, or similar to, that of the communication interface illustrated in FIG. 1. The communication module 1420 may include, for example, a cellular module 1421, a Wi-Fi module 1423, a Bluetooth (BT) module 1425, a GNSS module 1427 (for example, a GPS module, a Glonass module, a Beidou module, or a Galileo module), an NFC module 1428, and a Radio Frequency (RF) module 1429.

The cellular module 1421 may provide, for example, a voice call, a video call, a text message service, an Internet service, etc. through a communication network. According to an embodiment, the cellular module 1421 may identify and authenticate the electronic device 1401 within a communication network using the subscriber identification module 1424 (for example, a SIM card). According to an embodiment, the cellular module 1421 may perform at least some of the functions that the processor 1410 may provide. According to an embodiment of the present disclosure, the cellular module 1421 may include a Communication Processor (CP).

The Wi-Fi module 1423, the BT module 1425, the GNSS module 1427, or the NFC module 1428 may include, for example, a processor for processing data that is transmitted and received through the corresponding module. According to some embodiments, at least some (two or more) of the cellular module 1421, the Wi-Fi module 1423, the BT module 1425, the GNSS module 1427, and the NFC module 1428 may be included in one Integrated Chip (IC) or IC package.

The RF module 1429, for example, may transmit/receive a communication signal (for example, an RF signal). The RF module 1429 may include, for example, a transceiver, a Power Amplifier Module (PAM), a frequency filter, a Low Noise Amplifier (LNA), an antenna, etc. According to another embodiment, at least one of the cellular module 1421, the Wi-Fi module 1423, the BT module 1425, the GNSS module 1427, and the NFC module 1428 may transmit/receive an RF signal through a separate RF module.

The subscriber identification module 1424 may include, for example, a card that includes a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 1430 (for example, the memory 130) may include, for example, an internal memory 1432 or an external memory 1434. The internal memory 1432 may include at least one of, for example, a volatile memory (e.g., a Dynamic Random Access Memory (DRAM), a Static RAM (SRAM), a Synchronous Dynamic RAM (SDRAM), etc.) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), etc.).

The external memory 1434 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 1434 may be functionally and/or physically connected to the electronic device 1401 through various interfaces.

The sensor module 1440 may, for example, measure a physical quantity or detect the operating state of the electronic device 1401 and may convert the measured or detected information into an electrical signal. The sensor module 1440 may include, for example, at least one of a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (e.g., a Red, Green, and Blue (RGB) sensor), a biometric sensor 1440I, a temperature/humidity sensor 1440J, an illumination sensor 1440K, and a ultraviolet (UV) sensor 1440M. Additionally or alternatively, the sensor module 1440 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 1440 may further include a control circuit for controlling one or more sensors included therein. In some embodiments, the electronic device 1401 may further include a processor configured to control the sensor module 1440 as a part of, or separately from, the processor 1410, and may control the sensor module 1440 while the processor 1410 is in a sleep state.

The input device 1450 may include, for example, a touch panel 1452, a (digital) pen sensor 1454, a key 1456, and an ultrasonic input device 1458. The touch panel 1452 may use, for example, at least one of a capacitive type, a resistive type, an infrared type, and an ultrasonic type. Furthermore, the touch panel 1452 may further include a control circuit. The touch panel 1452 may further include a tactile layer to provide a tactile reaction to a user.

The (digital) pen sensor 1454 may include, for example, a recognition sheet that is a part of, or separate from, the touch panel. The key 1456 may include, for example, a physical button, an optical key, or a keypad. The ultrasonic input device 1458 may detect an ultrasonic wave generated by an input tool through a microphone and identify data corresponding to the detected ultrasonic wave.

The display 1460 may include a panel 1462, a hologram device 1464, or a projector 1466. The panel 1462 may be implemented to be, for example, flexible, transparent, or wearable. The panel 1462, together with the touch panel 1452, may be implemented as one module. The hologram device 1464 may show a three dimensional image in the air by using an interference of light. The projector 1466 may display an image by projecting light onto a screen. The screen may be located, for example, in the interior of, or on the exterior of, the electronic device 1401. According to an embodiment, the display 1460 may further include a control circuit for controlling the panel 1462, the hologram device 1464, or the projector 1466.

The interface 1470 may include, for example, a High-Definition Multimedia Interface (HDMI) 1472, a Universal Serial Bus (USB) 1474, an optical interface 1476, or a D-subminiature (D-sub) 1478. Additionally or alternatively, the interface 1470 may include, for example, a Mobile High-definition Link (MHL) interface, a Secure Digital (SD) card/Multi-Media Card (MMC) interface, or an Infrared Data Association (IrDA) standard interface.

The audio module 1480 may convert, for example, a sound into an electrical signal, and vice versa. At least some elements of the audio module 1480 may be included in, for example, the input/output interface. The audio module 1480 may process sound information that is input or output through, for example, a speaker 1482, a receiver 1484, earphones 1486, the microphone 1488, etc.

The camera module 1491 is a device that can photograph a still image and a moving image. According to an embodiment, the camera module 1491 may include one or more image sensors (for example, a front sensor or a rear sensor), a lens, an Image Signal Processor (ISP), or a flash (for example, an LED or xenon lamp).

The power management module 1495 may manage, for example, the power of the electronic device 1401. According to an embodiment, the power management module 1495 may include a Power Management Integrated Circuit (PMIC), a charger Integrated Circuit (IC), or a battery or fuel gauge. The PMIC may use a wired and/or wireless charging method. Examples of the wireless charging method may include a magnetic resonance method, a magnetic induction method, an electromagnetic wave method, etc. Additional circuits (for example, a coil loop, a resonance circuit, a rectifier, etc.) for wireless charging may be further included. The battery gauge may measure, for example, the residual amount of the battery 1496 and a voltage, current, or temperature while charging. The battery 1496 may include, for example, a rechargeable battery and/or a solar battery.

The indicator 1497 may indicate a particular state (for example, a booting state, a message state, a charging state, and the like) of the electronic device 1401 or a part (for example, the processor 1410) thereof. The motor 1498 may convert an electrical signal into a mechanical vibration and may generate a vibration, a haptic effect, etc. Although not illustrated, the electronic device 1401 may include a processing unit (for example, a GPU) for supporting mobile TV. The processing unit for supporting the mobile TV may process media data according to a standard, such as Digital Multimedia Broadcasting (DMB), Digital Video Broadcasting (DVB), MediaFlo™, and the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various embodiments, a storage medium may have instructions stored therein, and when executed by at least one processor, the instructions may cause the at least one processor to execute at least one operation, the at least one operation including: acquiring a signal from a first external electronic device; generating connection information by using at least a part of information included in the signal; and establishing a connection with the second external electronic device which has received the signal from the first external electronic device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
at least one communication interface configured to acquire information on at least one external device; and
a processor,
wherein the processor is configured to:
acquire, from a first external electronic device, a signal associated with identification information on the first external electronic device through the at least one communication interface;
generate connection information for establishing a connection with a second external electronic device at least partially based on the identification information; and
establish the connection with the second external electronic device through the at least one communication interface at least partially based on the generated connection information.

2. The electronic device of claim 1, wherein the connection information comprises at least one of information on the electronic device that is used for establishing the connection with the second external electronic device and information on the second external electronic device.

3. The electronic device of claim 1, wherein the at least one communication interface comprises a first communication interface and a second communication interface, and
the processor is configured to:
acquire the signal from the first external electronic device through the first communication interface, and
establish the connection with the second external electronic device through the second communication interface.

4. The electronic device of claim 3, wherein the first communication interface comprises a sensing unit for sensing a light, and
the processor is configured to receive the signal from the first external electronic device through the light sensed by the sensing unit.

5. The electronic device of claim 3, wherein the first communication interface comprises a microphone for sensing a sound, and
the processor is configured to receive the signal from the first external electronic device through the sound sensed by the microphone.

6. The electronic device of claim 3, wherein the first communication interface comprises a first short-range wireless communication circuit;
the second communication interface comprises a second short-range wireless communication circuit; and
the processor is configured to:
receive the signal from the first external electronic device through the first short-range wireless communication circuit, and
establish the connection with the second external electronic device through the second short-range wireless communication circuit.

7. The electronic device of claim 1, wherein the at least one external device comprises a third external electronic device and a fourth external electronic device, and
the processor is configured to:
generate connection information for establishing a connection with the third external electronic device and the fourth external electronic device at least partially based on the identification information; and
establish a connection with the third external electronic device and the fourth external electronic device through the at least one communication interface at least partially based on the generated connection information.

8. The electronic device of claim 1, wherein the processor is configured to:
acquire network information corresponding to the second external electronic device and a third external electronic device that has received a signal from the first external electronic device through the at least one communication interface; and
establish the connection with the second external electronic device and a connection with the third external electronic device through the at least one communication interface, based on the connection information and the network information.

9. The electronic device of claim 8, wherein the processor is configured to:
receive, from the second external electronic device and the third external electronic device, respectively, a first control signal and a second control signal through the at least one communication interface; and
execute a command corresponding to a control signal having a greater signal strength between the first and second control signals.

10. The electronic device of claim 1, wherein the processor is configured to:
receive a connection request from a third external electronic device that has acquired the signal from the first external electronic device through the at least one communication interface, and
upon receiving the connection request, transmit, to the third external electronic device, information on the second external electronic device with which the connection has been established by using the at least one communication interface.

11. The electronic device of claim 1, further comprising a display, and
wherein the processor is configured to:
determine whether user biometric information is requested for establishing the connection with the second external electronic device at least partially based on the signal, and
when it is determined that the user biometric information is requested, display, on the display, a pop-up message requiring the user biometric information.

12. The electronic device of claim 11, further comprising at least one sensor for sensing the user biometric information,
wherein the processor is configured to generate connection information at least partially based on the identification information and the user biometric information sensed by the sensor.

13. The electronic device of claim 1, wherein the first external electronic device is configured to determine whether a user has access, through at least one sensor included in the first external electronic device, and broadcast the signal when it is determined that the user has achieved access.

14. The electronic device of claim 1, wherein the processor is configured to:
   compare the connection information for the connection establishment with connection information generated by the second external electronic device at least partially based on the identification information, and
   when the connection information generated by the second external electronic device corresponds to the connection information for the connection establishment, establish the connection with the second external electronic device.

15. The electronic device of claim 1, wherein the at least one communication interface comprises a wireless communication circuit, and
   the processor is configured to receive the signal, from the first external electronic device, through a network connected using the wireless communication circuit.

16. The electronic device of claim 1 wherein when the identification information is changed, the processor is configured to change the connection information using at least a part of the changed identification information.

17. A method for establishing, by an electronic device, a connection with an external electronic device, comprising:
   acquiring, from a first external electronic device, a signal associated with identification information on the first external electronic device;
   generating connection information for establishing a connection with a second external electronic device at least partially based on the identification information; and
   establishing the connection with the second external electronic device at least partially based on the generated connection information.

18. The method of claim 17, wherein the connection information comprises at least one of information on the electronic device that is used for establishing the connection with the second external electronic device and information on the second external electronic device.

19. The method of claim 17, further comprising:
   acquiring network information corresponding to the second external electronic device and a third external electronic device; and
   establishing the connection with the second external electronic device and a connection with the third external electronic device based on the connection information and the network information.

20. The method of claim 19, further comprising:
   receiving a first control signal and a second control signal from each of the second external electronic device and the third external electronic device; and
   executing a command corresponding to a control signal having a greater signal strength between the first and second control signals.

* * * * *